(12) United States Patent
Hodroj

(10) Patent No.: US 9,876,523 B2
(45) Date of Patent: Jan. 23, 2018

(54) SMARTPHONE CASE WITH CONCEALED CARD CACHE, AND METHOD OF USING SAME

(71) Applicant: Ahmad H. Hodroj, Dearborn, MI (US)

(72) Inventor: Ahmad H. Hodroj, Dearborn, MI (US)

( * ) Notice: Subject to any disclaimer, the term of this patent is extended or adjusted under 35 U.S.C. 154(b) by 0 days.

(21) Appl. No.: 15/136,382

(22) Filed: Apr. 22, 2016

(65) Prior Publication Data

US 2017/0026070 A1     Jan. 26, 2017

Related U.S. Application Data

(60) Provisional application No. 62/152,111, filed on Apr. 24, 2015.

(51) Int. Cl.
| | |
|---|---|
| *H04B 1/3888* | (2015.01) |
| *A45C 11/18* | (2006.01) |
| *A45C 1/06* | (2006.01) |
| *A45C 15/04* | (2006.01) |
| *A45C 11/00* | (2006.01) |

(52) U.S. Cl.
CPC ............ *H04B 1/3888* (2013.01); *A45C 1/06* (2013.01); *A45C 11/182* (2013.01); *A45C 15/04* (2013.01); *A45C 2001/065* (2013.01); *A45C 2011/002* (2013.01)

(58) Field of Classification Search
CPC ................... H04B 1/3888; A45C 11/00–15/08
See application file for complete search history.

(56) References Cited

U.S. PATENT DOCUMENTS

| | | | |
|---|---|---|---|
| 4,141,400 A | | 2/1979 | Mangan |
| 4,852,727 A | * | 8/1989 | Oberle ............... A45C 11/182 206/39.4 |
| 5,125,505 A | * | 6/1992 | Kurosaki ............ A45C 11/182 206/38 |
| 5,791,461 A | * | 8/1998 | Tsuge ................. A45C 11/182 206/39.4 |
| 6,412,627 B1 | | 7/2002 | Tiscione et al. |
| D470,657 S | | 2/2003 | Kawamura |
| (Continued) | | | |

FOREIGN PATENT DOCUMENTS

| | | |
|---|---|---|
| EP | 2685343 A1 | 1/2014 |
| FR | 2893233 A1 | 5/2007 |
| WO | 2013124593 A1 | 8/2013 |

OTHER PUBLICATIONS

Commercially available smartphone case with concealed card slot sold under the brand "Switcheasy CardTM" by SwitchEasy Limited LLC of Hong Kong available at https://www.switcheasy.com/iphone-44s/63-capsulerebel-4 and/or www.switcheasy.com.

*Primary Examiner* — Gennadiy Tsvey
(74) *Attorney, Agent, or Firm* — Carrier Blackman & Associates, P.C.; William D. Blackman; Joseph P. Carrier

(57) ABSTRACT

A smartphone case is provided with a card cache assembly for concealing one or a few cards therein, which may be credit cards, identity cards, or other cards selected by a user. The card cache assembly includes a slidably mounted card support member and a latch for retaining the tray inside of a main cache body. The smartphone case includes a concealed switch, which is operable to release the card support member from the main cache body using a spring-loaded ejection mechanism.

19 Claims, 24 Drawing Sheets

(56) References Cited

U.S. PATENT DOCUMENTS

| | | | |
|---|---|---|---|
| 6,889,696 B2* | 5/2005 | Thorpe | A45D 33/008 132/287 |
| 7,267,147 B2* | 9/2007 | Tiscione | A45C 11/182 150/147 |
| D626,119 S | 10/2010 | Fellig | |
| 7,830,672 B1* | 11/2010 | Kitchen | A45C 11/182 174/350 |
| 7,857,022 B2 | 12/2010 | Kraml | |
| 7,865,210 B2 | 1/2011 | Wang et al. | |
| 8,047,364 B2 | 11/2011 | Longinotti-Buitoni | |
| 8,267,251 B2 | 9/2012 | Mongan et al. | |
| 8,418,852 B2* | 4/2013 | Ziemba | A45C 1/04 206/235 |
| 8,504,127 B2* | 8/2013 | Altschul | H04M 1/0283 206/216 |
| 8,528,812 B2 | 9/2013 | Gannon | |
| 8,596,449 B2* | 12/2013 | Mongan | A45C 11/182 206/320 |
| 8,730,043 B1* | 5/2014 | Guincho | G06Q 20/363 235/375 |
| 8,833,379 B1* | 9/2014 | Kaplan | A45D 33/26 132/287 |
| D724,785 S* | 3/2015 | Frederick | D14/250 |
| 8,967,377 B2* | 3/2015 | Lebauer | B65D 81/02 206/320 |
| 9,241,551 B2* | 1/2016 | Lawson | A45C 11/00 |
| 9,339,094 B2* | 5/2016 | Tucker-Skow | A45C 11/182 |
| 2003/0034891 A1* | 2/2003 | Pedersen | G06K 19/005 340/568.7 |
| 2006/0042971 A1* | 3/2006 | Holmes | A45C 11/24 206/235 |
| 2006/0057892 A1* | 3/2006 | Bricaud | G06K 13/08 439/630 |
| 2006/0176524 A1* | 8/2006 | Willrich | G06F 1/1616 358/474 |
| 2006/0226217 A1* | 10/2006 | Narendra | G06Q 20/341 235/380 |
| 2007/0046037 A1* | 3/2007 | Cho | E05B 77/06 292/304 |
| 2009/0026277 A1* | 1/2009 | Phillips | G06Q 20/204 235/495 |
| 2009/0101255 A1 | 4/2009 | Long | |
| 2010/0116702 A1* | 5/2010 | Schentrup | A45C 11/182 206/307 |
| 2010/0122439 A1* | 5/2010 | Britton | H04B 1/3888 24/306 |
| 2010/0182764 A1* | 7/2010 | Phillips | H05K 9/002 361/816 |
| 2010/0224519 A1 | 9/2010 | Kao | |
| 2011/0077061 A1* | 3/2011 | Danze | H04M 1/185 455/575.1 |
| 2011/0089077 A1* | 4/2011 | Ziemba | A45C 11/00 206/570 |
| 2011/0089078 A1* | 4/2011 | Ziemba | A45C 1/04 206/570 |
| 2011/0192857 A1* | 8/2011 | Rothbaum | B25F 1/00 220/694 |
| 2011/0284407 A1* | 11/2011 | Connolly | A45C 1/06 206/320 |
| 2011/0294556 A1* | 12/2011 | Carlberg | A45C 11/00 455/575.8 |
| 2012/0067751 A1* | 3/2012 | Mongan | A45C 11/00 206/216 |
| 2012/0168336 A1* | 7/2012 | Schmidt | H04M 1/04 206/478 |
| 2012/0244918 A1 | 9/2012 | Hall | |
| 2012/0264491 A1* | 10/2012 | Singhal | H04M 1/21 455/575.1 |
| 2013/0043144 A1* | 2/2013 | McDonald | A45C 11/00 206/38 |
| 2013/0157730 A1* | 6/2013 | McCormac | H04W 88/02 455/575.8 |
| 2013/0271897 A1* | 10/2013 | Limber | H04B 1/3888 361/679.01 |
| 2013/0313252 A1* | 11/2013 | Chan | H04M 1/04 220/4.02 |
| 2014/0006277 A1 | 1/2014 | Rao | |
| 2014/0051488 A1* | 2/2014 | Chung | H04M 1/0279 455/575.8 |
| 2014/0066142 A1* | 3/2014 | Gipson | H04B 1/3888 455/575.8 |
| 2014/0066143 A1* | 3/2014 | Choi | H04B 1/3888 455/575.8 |
| 2014/0091689 A1* | 4/2014 | Mishan | H05K 5/02 312/237 |
| 2014/0116895 A1* | 5/2014 | Ellenburg | H04B 1/3888 206/37 |
| 2014/0128132 A1* | 5/2014 | Cox, III | H04B 1/3888 455/575.8 |
| 2014/0216976 A1* | 8/2014 | Conarro | A45C 11/00 206/525 |
| 2014/0228082 A1* | 8/2014 | Morrow | H04B 1/3888 455/575.8 |
| 2014/0376763 A1* | 12/2014 | Stevinson | A45C 11/00 381/370 |
| 2015/0018056 A1* | 1/2015 | Gillikin | H04M 1/04 455/575.8 |
| 2015/0102073 A1* | 4/2015 | Pusateri | H04B 1/3888 224/191 |
| 2015/0141082 A1* | 5/2015 | Ehrlich | H04B 1/3888 455/575.1 |
| 2015/0156301 A1* | 6/2015 | Crawford | H04M 1/0262 455/420 |
| 2015/0244407 A1* | 8/2015 | Peral | H04B 1/3888 455/575.8 |
| 2015/0249730 A1* | 9/2015 | Larsen | G03B 17/561 29/428 |
| 2016/0014922 A1* | 1/2016 | Banerjee | A45C 7/0031 206/38 |
| 2016/0206062 A1* | 7/2016 | Marvin | A45C 11/00 |

* cited by examiner

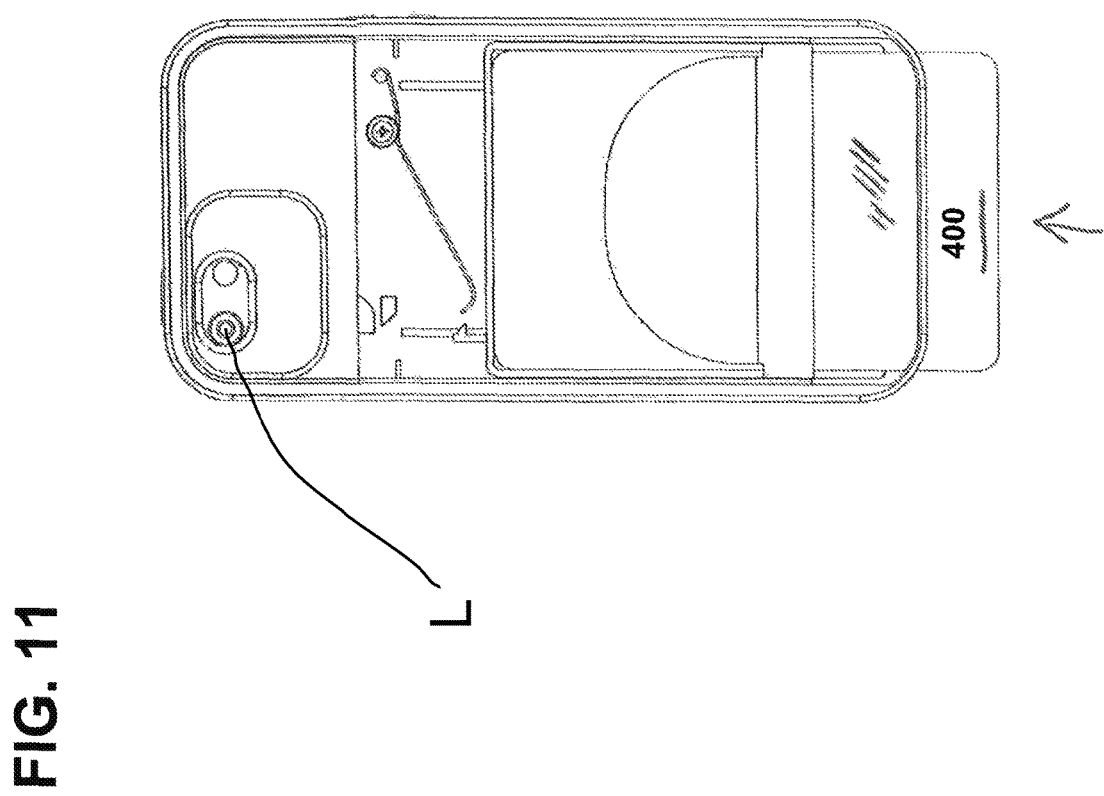

SMARTPHONE CASE WITH CONCEALED CARD CACHE, AND METHOD OF USING SAME

CROSS-REFERENCE TO RELATED APPLICATIONS

The present invention claims priority under 35 USC 119 based on U.S. Provisional Patent Application No. 62/152,111, filed on Apr. 24, 2015. The entire subject matter of this priority document, including specification claims and drawings thereof, is incorporated by reference herein.

BACKGROUND OF THE INVENTION

1. Field of the Invention

The present invention relates to a smartphone case with a concealed internal card cache, and to a method of using such a case to store one or more cards, such as credit cards, identity cards, other plastic cards bearing a magnetic strip, or business cards. More particularly, the present invention relates to a smartphone case with a card cache including a slidably mounted card support drawer, a latch for retaining the tray inside of a main case body, and a concealed switch which is operable to release the card support drawer using a spring-loaded ejection mechanism.

2. Description of the Background Art

Many different smartphone cases are known and commercially available. A number of different devices are known for storing cards such as identity cards or credit cards.

Examples of some of the known card storage devices include Kawamura, U.S. Design Pat. 470,657, Fellig, U.S. Design Pat. 626,119, Mangan, U.S. Pat. No. 4,141,400, Tiscione et al., U.S. Pat. No. 6,412,627, Wang et al., U.S. Pat. No. 7,865,210, Longinotti-Buitoni, U.S. Pat. No. 8,047,364, Mongan et al., U.S. Pat. No. 8,267,251, Gannon, U.S. Pat. No. 8,528,812, Long, US Pub. 2009/0101255, Kao, US Pub. 2010/0224519, Hall, US Pub. 2012/0244918, Raj, US Patent Publication 2014/0006277, Schmid, European Patent Publication 2,685,343, Kraml, French Patent Publication 2,893,233, and Broly, WIPO Publication 2013124593. In addition, a commercial smartphone case with a concealed card slot is commercially available and sold under the brand "Switcheasy CARD™" by SwitchEasy Limited LLC of Hong Kong. This case includes a highly visible activation button, and can be obtained from www.switcheasy.com. The Switcheasy CARD case merely pushes the card part way out of the phone case when the button is slid out, and the user must then grasp the exposed edge of the card and pull it out of the case.

Although the known devices have some utility for their intended purposes, a need still exists in the art for an improved smartphone case with card-storage capability. In particular, there is a need for an improved smartphone case with a card cache which will actively expel a card support drawer when a switch is activated.

SUMMARY OF THE INVENTION

Accordingly, it is an object of the present invention to provide a smartphone case with a card cache including a slidably mounted card support drawer.

It is another object of the present invention to provide a smartphone case capable of storing more than one card therein.

It is another object of the present invention to provide such a smartphone case which includes a latch for retaining a card support drawer inside of a main case body, and a switch which is operable to release the card support drawer using a spring-loaded ejection mechanism.

In one illustrative embodiment of the present invention, a smartphone case is provided with a card cache assembly for concealing one or a few cards therein, which may be credit cards, identity cards, or other cards selected by a user. The card cache assembly includes a slidably mounted card support drawer, and a latch for retaining the tray inside of a main cache body. The smartphone case also includes a switch which is operable to release the card support drawer from the main cache body, when activated, using a spring-loaded ejection mechanism.

It is an important feature of the present invention that when one or more cards, such as credit cards, I.D. cards, room keys or the like are inside of the smartphone case, the cards are substantially concealed and hidden from sight, such that a casual observer would not easily realize that the smartphone case 20 is different from any other protective case.

It is a feature of one embodiment of the present invention that the activation switch for releasing the card or cards from inside of the smartphone case may not be readily apparent from a visual inspection of the case.

It is another feature of one embodiment of the present invention that activation of the activation switch requires a predetermined sequence of movement of that switch in two different directions before the case will release the card(s).

Other objects, features and advantages of the present invention may be understood from a review of the following detailed description section, which should be read in conjunction with the accompanying drawings. Throughout the following detailed description and in the drawings, like numbers refer to like parts.

BRIEF DESCRIPTION OF THE DRAWINGS

FIG. 11 is a top plan view of the card cache assembly shown at the beginning of a first step in a method according to the present invention, in which a card is inserted into the case.

DETAILED DESCRIPTION OF ILLUSTRATIVE EMBODIMENTS

Figure 1:
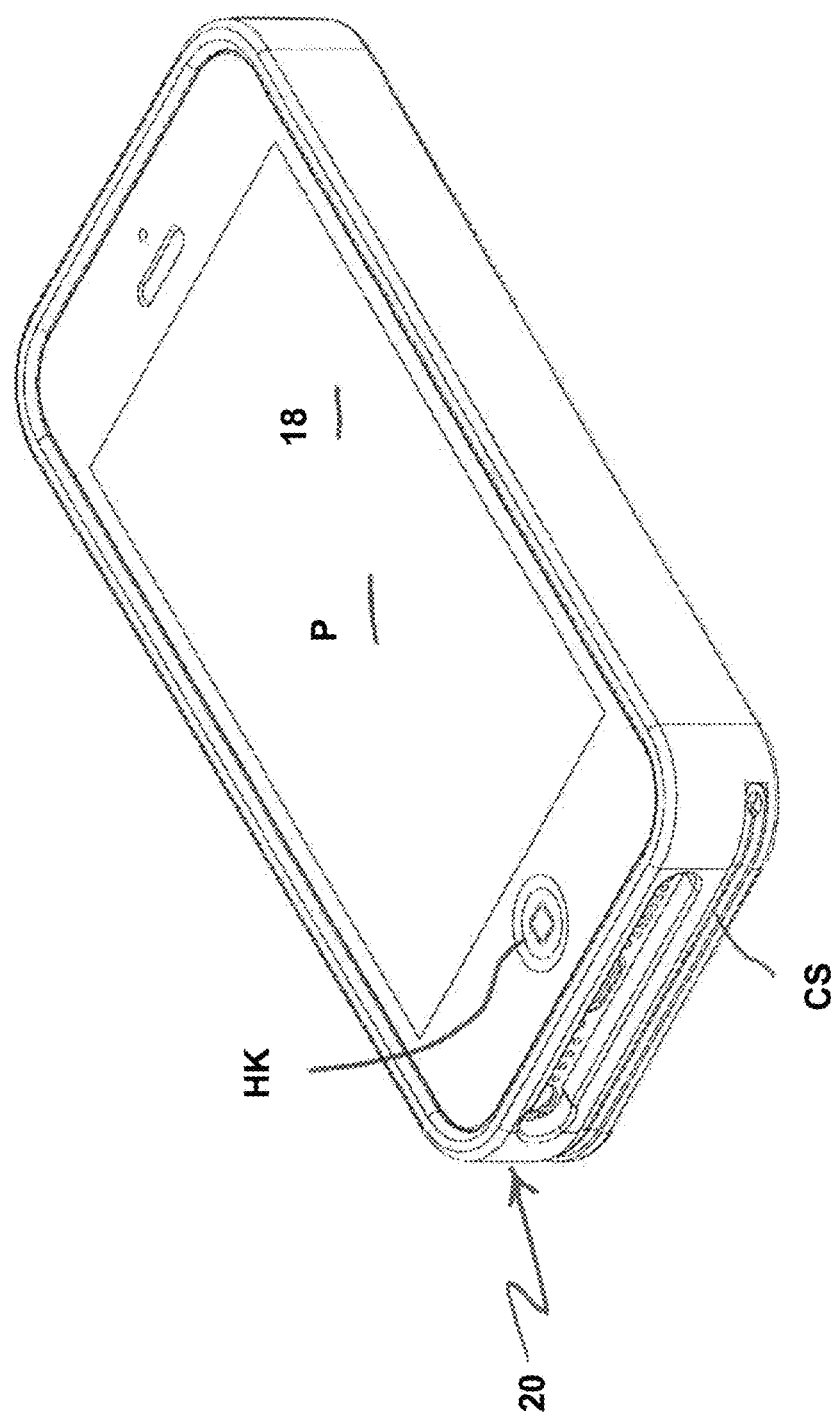
FIG. 1 is a perspective view of a smartphone case according to a first illustrative embodiment of the present invention, the case having a smartphone installed therein and oriented showing a user interface surface of the smartphone facing up, and also showing a charger connection end of the phone.

It should be understood that only structures and methodology needed for illustrating selected embodiments of the present invention are described herein. Other conventional structures, and those of ancillary and auxiliary components of the system, will be known and understood by those skilled in the art.

Throughout the present specification, relative positional terms like 'upper', 'lower', 'front', 'rear', 'top', 'bottom', 'horizontal', 'vertical', and the like are used to refer to the orientation of the apparatus as shown in the drawings. These terms are used in an illustrative sense to describe the depicted embodiments, and are not meant to be limiting. It will be understood that the depicted apparatus may be placed at an orientation different from that shown in the drawings, such as inverted 180 degrees or transverse to that shown, and in such a case, the above-identified relative positional terms will no longer be accurate.

Referring now to FIGS. 1-5, the present invention provides a smartphone case 20 for protectively and nestingly receiving a smartphone P therein. The smartphone P is commercially available and does not, per se, form a part of the present invention. For purposes of convenience, the terms "smartphone" and "phone" have the same meaning and are used interchangeably herein.

The smartphone case 20 includes a card cache assembly 22 for storing at least one card C therein, as will be described in further detail herein. The card cache assembly is specifically designed to receive and store cards which are 3⅜×2⅛ in (85.60×53.98 mm), conforming to the ISO/IEC 7810 ID-1 standard.

Referring now to the drawings, FIG. 1 is a perspective view of the smartphone case 20 according to a first illustrative embodiment of the present invention, the case having a smartphone P installed therein and oriented showing a user interface surface of the smartphone facing upwardly, and also showing a power connection end of the phone.

Figure 2:
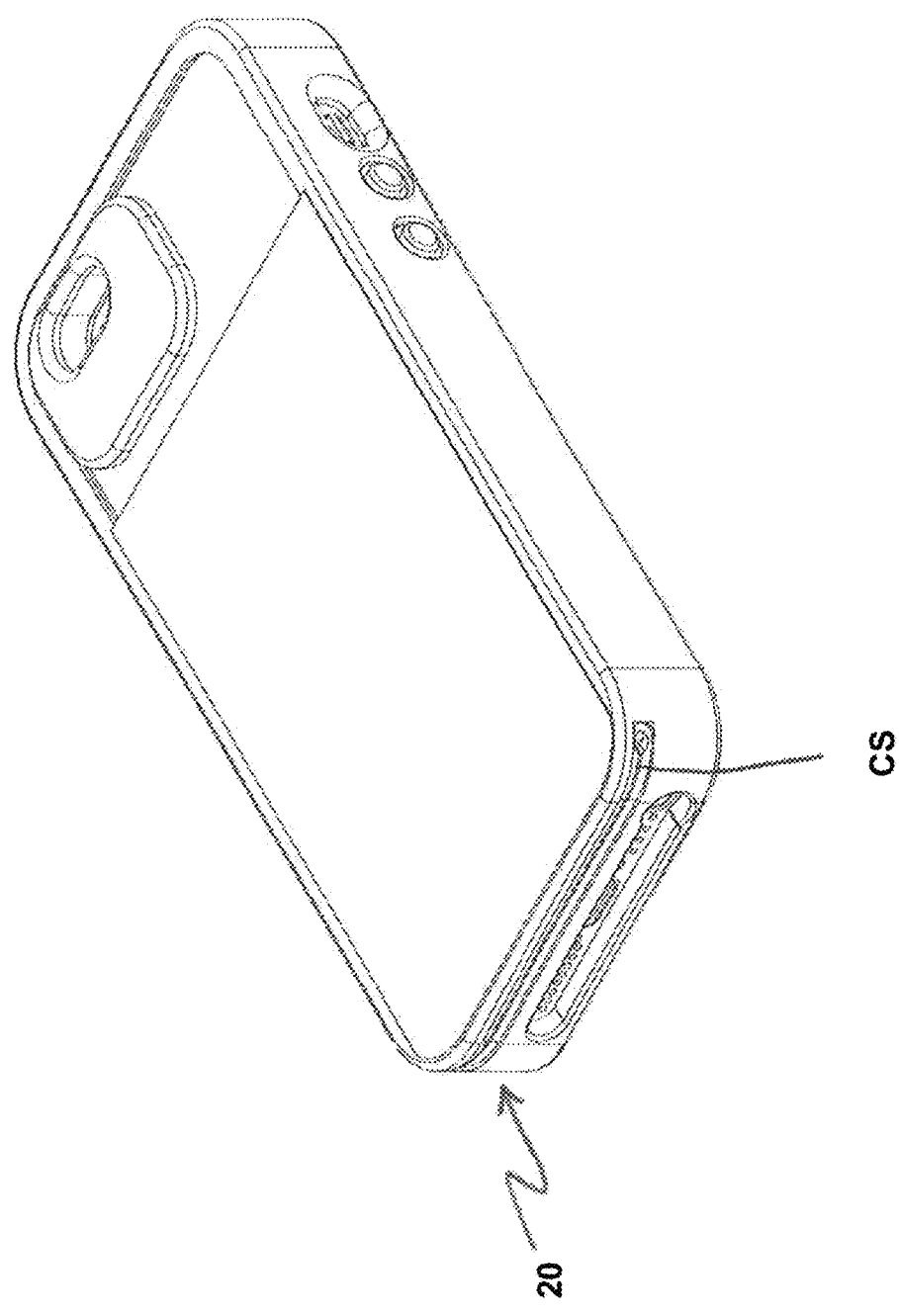
FIG. 2 is a perspective view of the smartphone case and smartphone of FIG. 1, the case shown inverted from the orientation of FIG. 1 with the user interface surface of the smartphone facing down.
Figure 3:
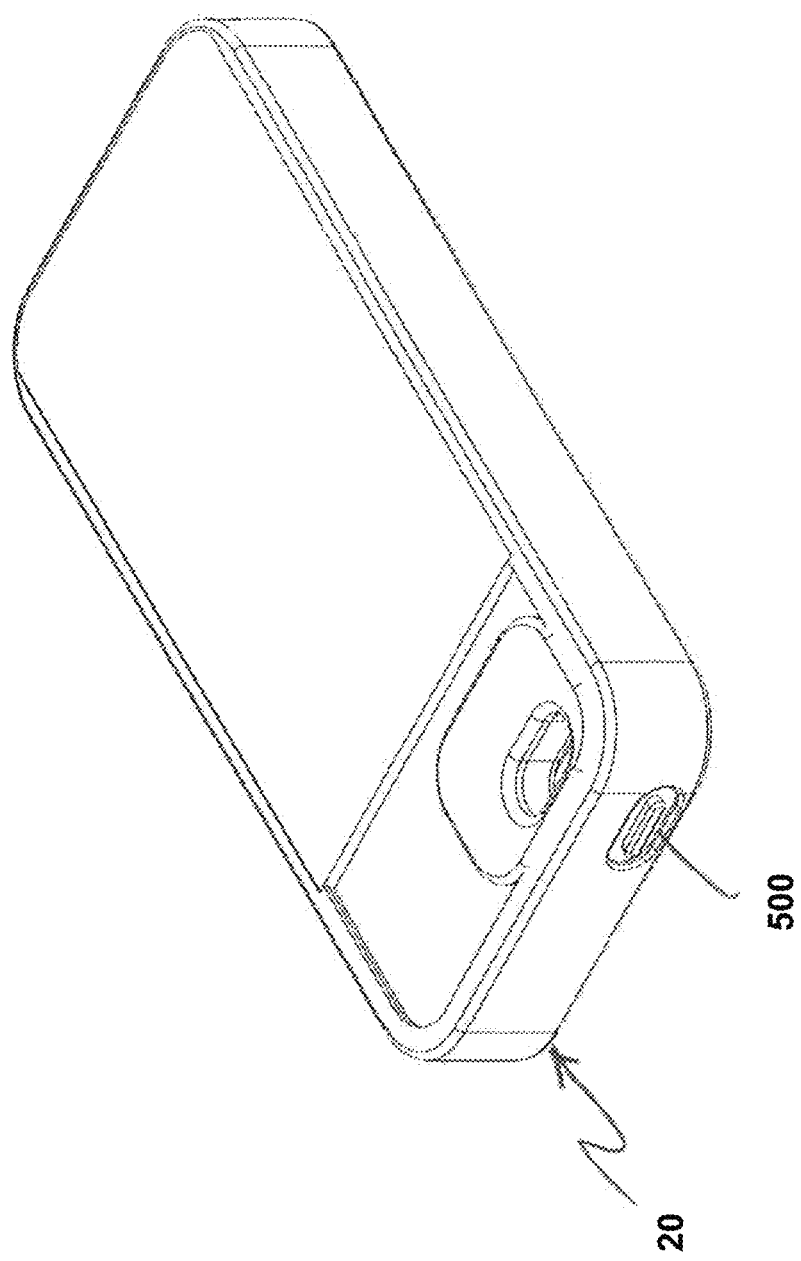
FIG. 3 is a perspective view of the smartphone case and smartphone of FIGS. 1-2, rotated 180 degrees from the position of FIG. 2 and showing a second end thereof with a main power button.
Figure 4:
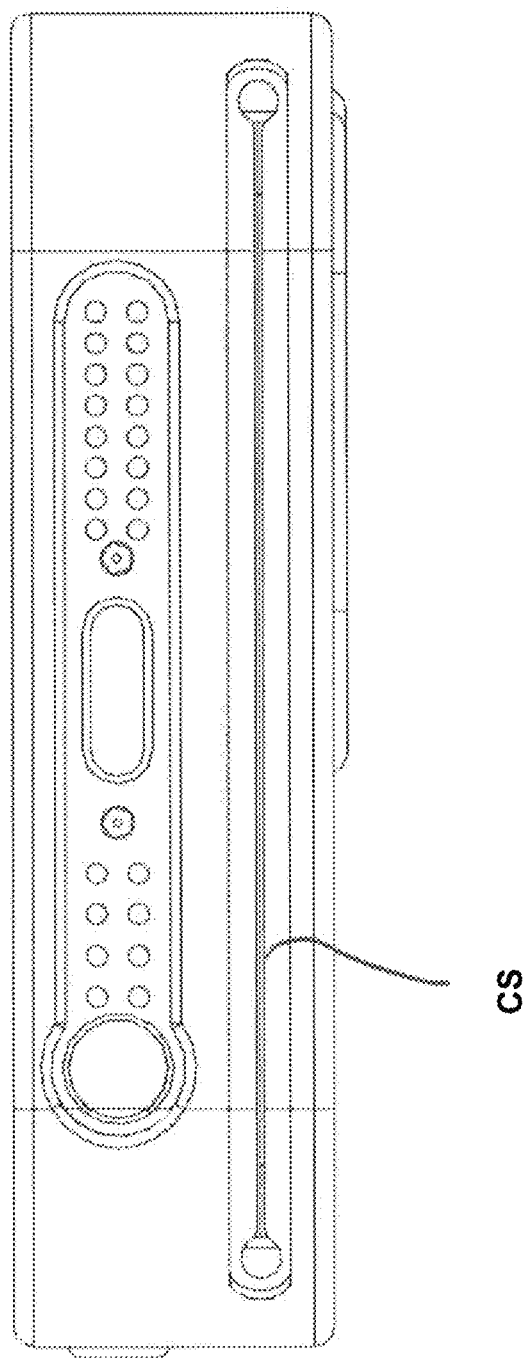
FIG. 4 is an end plan view of the smartphone case and smartphone of FIGS. 1-3.

FIG. 2 is a perspective view of the smartphone case 20 and smartphone P with the case shown inverted from the orientation of FIG. 1 and with the user interface surface of the smartphone facing down. FIG. 3 is a perspective view of the smartphone case and smartphone of FIGS. 1-2, rotated 180 degrees from the position of FIG. 2 and showing a second end thereof, including openings configured to allow a user to access a main power button 500 and a camera lens of the smartphone. FIG. 4 is an end plan view of the smartphone case and smartphone of FIGS. 1-3, showing the power connection end of the phone, and also showing a card slot CS formed in the case 20.

Figure 5:
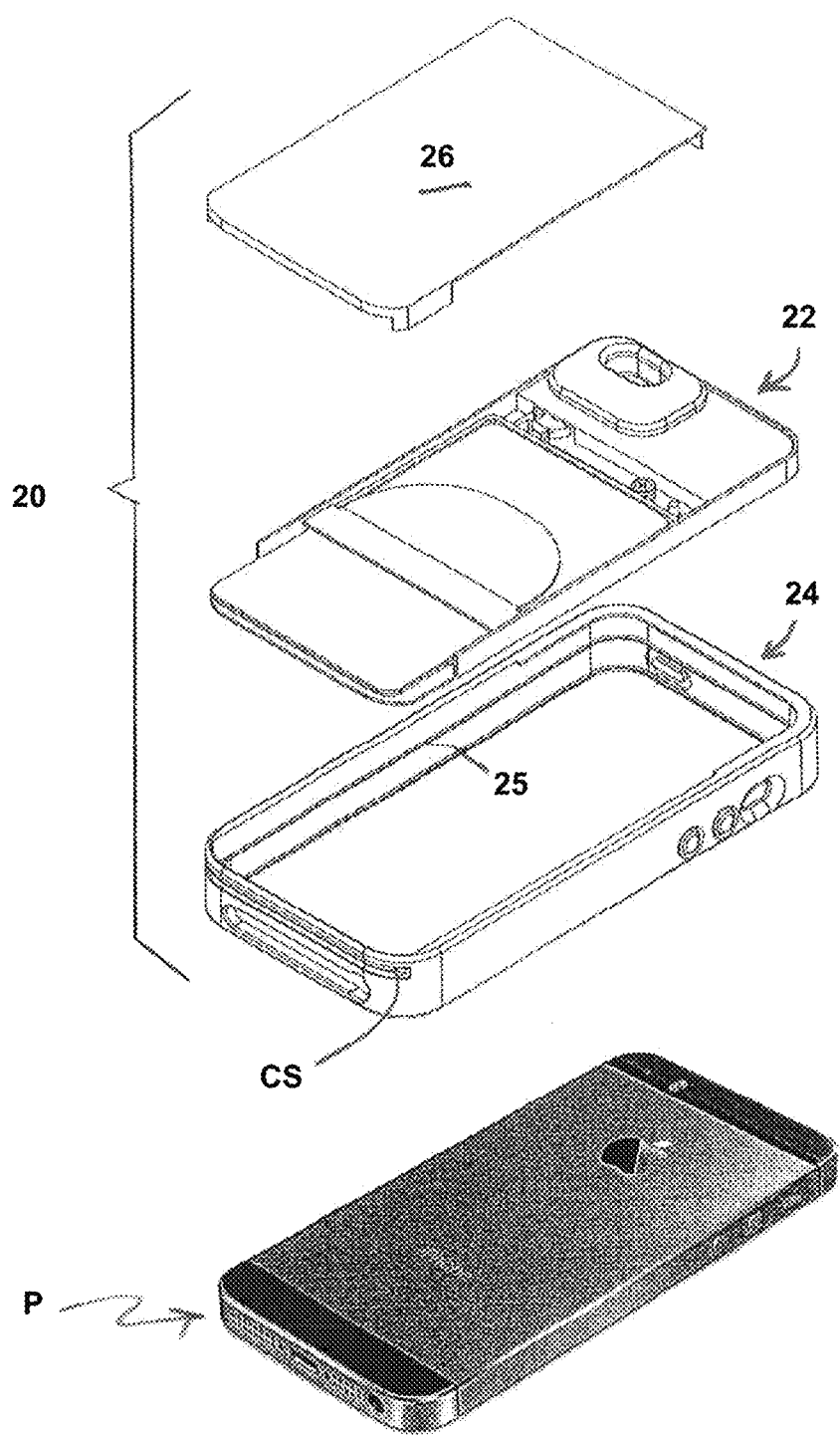
FIG. 5 is an exploded perspective view of the smartphone case and smartphone of FIGS. 1-2.

FIG. 5 is an exploded perspective view of the smartphone case 20 and smartphone P. Referring now to FIG. 5, it will be seen that the smartphone case 20 according to the first embodiment includes a main sleeve 24 having at least one intermediate alignment structure 25 therein. The main sleeve 24 is configured to protectively receive the smartphone P therein on a first side of the alignment structure 25, which is in the lower half of the sleeve in the orientation shown in FIG. 5, or the upper half as shown in FIG. 1, with the phone P oriented so that a user can easily access a user interface surface 18 thereof. The main sleeve 24 is open on the end thereof which receives the user interface surface, to enable a user to access that surface as well as the home key HK.

The main sleeve 24 has a number of openings formed therein, including the card slot CS. In the depicted embodiment, the intermediate alignment structure 25 is a rib extending inwardly and substantially continuously around an inner wall of the main sleeve 24 at a central or intermediate height portion of the sleeve. Alternatively, the alignment structure many be discontinuous or a series of spaced apart rib-like protrusions, all substantially coplanar.

The main sleeve 24 also has a number of additional openings formed therein for providing access to buttons on the phone P, such as volume buttons and a main power button 500. In one embodiment, the main sleeve 24 may have a slot formed therein to allow a switch to protrude outwardly from the smartphone case 20.

The smartphone case 20 also includes the card cache assembly 22, which is configured to fit into the main sleeve 24 on a second side of the alignment structure 25, which is the top half of the sleeve in the orientation shown in FIG. 5, with the cache assembly stacked abuttingly in contact with the rear surface of the phone P.

The smartphone case 20 according to the first embodiment also includes a cover plate 26, which fits over the card cache assembly 22 at a surface of the phone storage sleeve on a side opposite the smartphone P.

Figure 6:
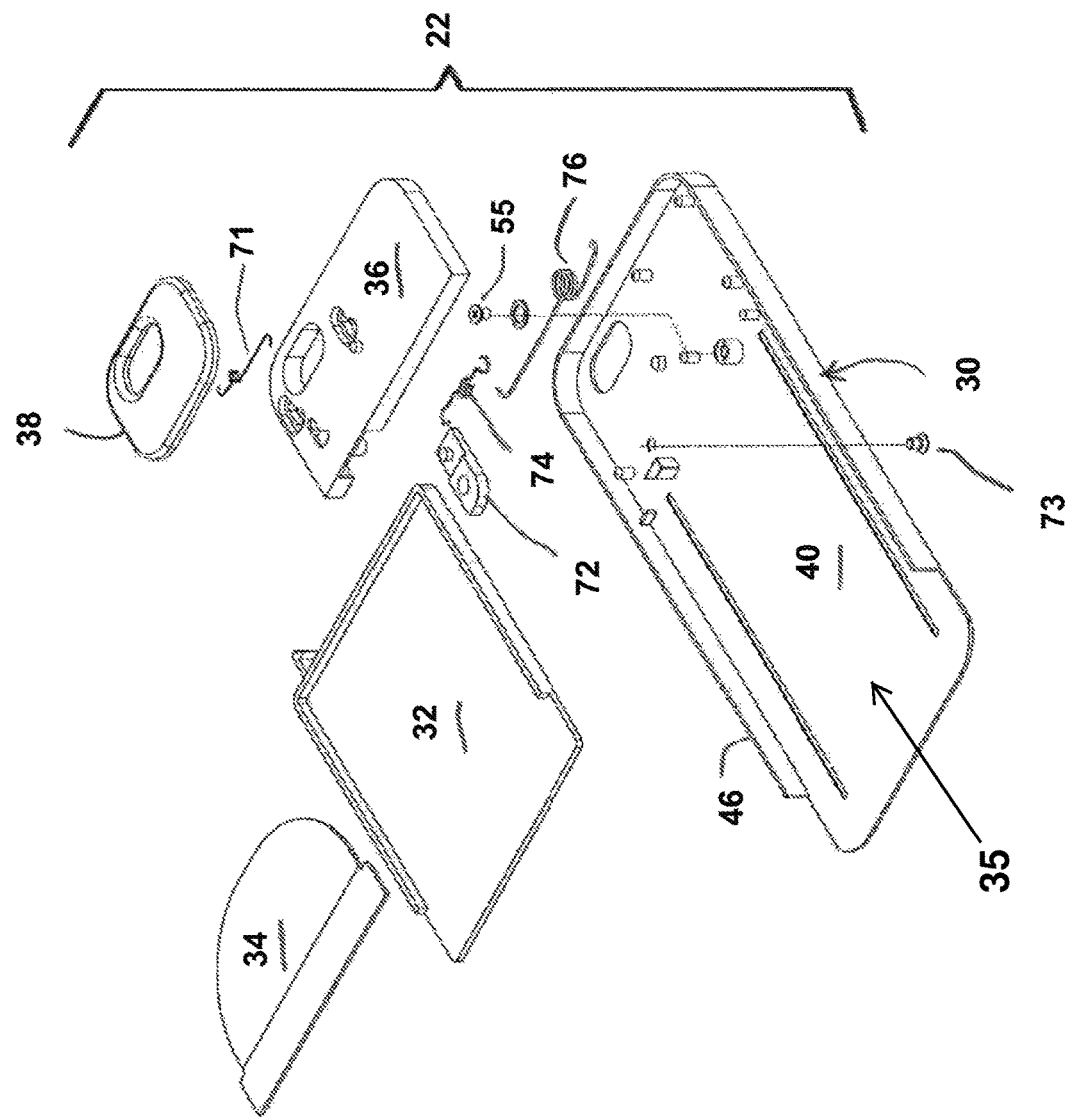
FIG. 6 is an exploded perspective view of a card cache assembly which is one component of the smartphone case of FIG. 5.

Referring now to FIG. 6, the components of the card cache assembly 22 are shown in an exploded view for illustrative purposes. The card cache assembly 22 includes a main cache body 30, a card support drawer 32 which fits slidably inside of the main cache body 30, and an optional spacer plate 34 which attaches to the top of the card support drawer.

The card cache assembly 22 also includes a cap member 36 which fits over the main cache body 30 at one end thereof, a switch button 38 for releasing the card support drawer from the main case body, and a latch release mechanism. Each of these components will be described in additional detail herein.

Figure 7:
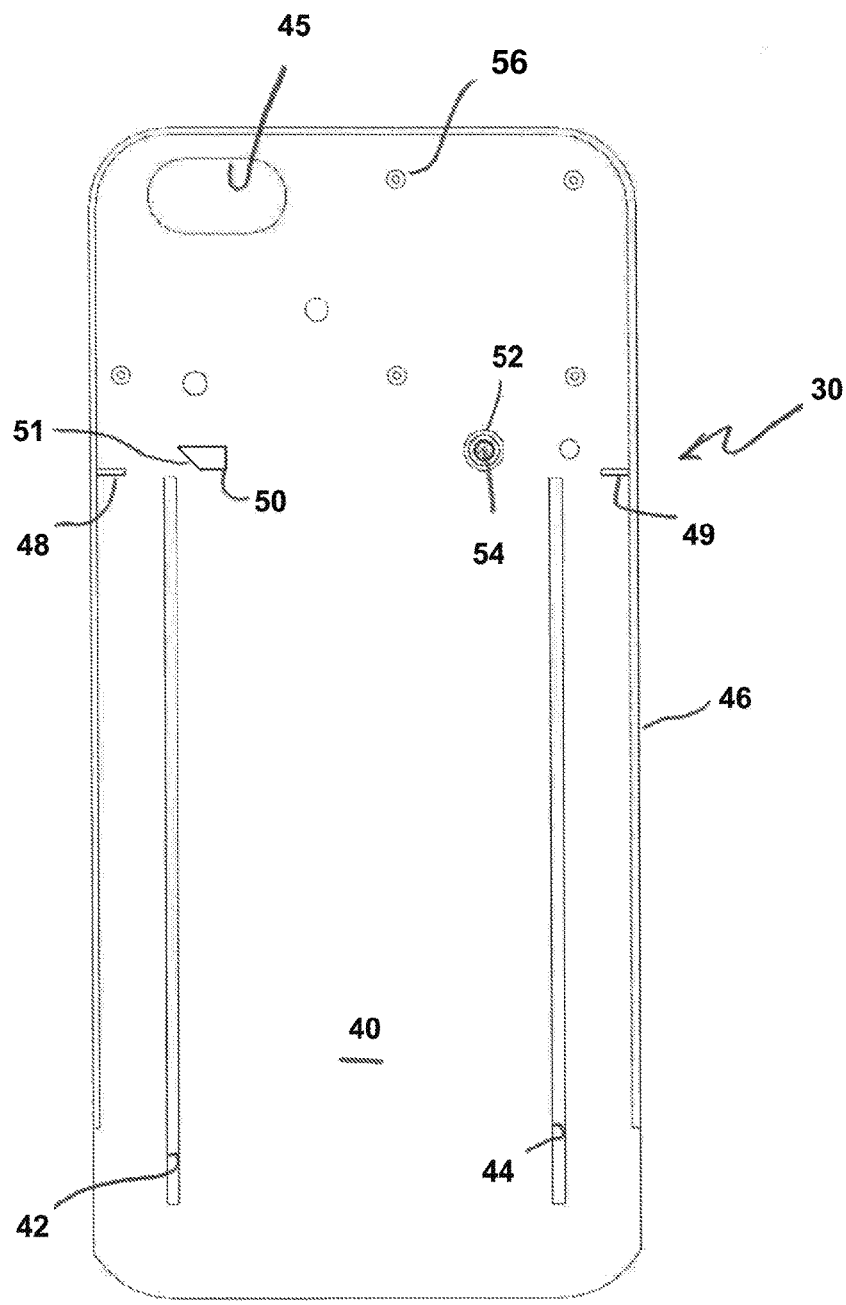
FIG. 7 is a top plan view of a main cache body which is a component of the card cache assembly of FIG. 6.

Referring also to FIG. 7, the main cache body 30 has a hollow space formed therein for storing the card support drawer 32, and has a primary opening 35 (FIG. 6), formed at one end thereof and communicating with the hollow space. The main cache body 30 includes a substantially rectangular floor panel 40 which may, optionally, have a pair of parallel guide slots 42, 44 formed therein. The main cache body has a hollow opening 45 formed through the floor panel 40 to provide access for the phone's camera lens L (FIG. 11) to view outwardly. The main cache body 30 also includes an outer side wall 46 surrounding portions of the floor panel 40 on three sides thereof.

The main cache body 30 further includes at least one stop member 48 extending inwardly from a portion of the side wall 46, to limit inward travel of the card support drawer 32. In the depicted embodiment, two stop members 48, 49 are provided, with one of these stop members on each of two opposite sides of the floor panel 40.

The main cache body 30 also includes a latching boss 50 integrally formed with and extending upwardly from the floor panel 40. The latching boss 50 is provided with an angled ramp face 51 to permit slidable movement of a locking pawl 68 therepast. The main cache body 30 further includes a first spring support boss 52 extending upwardly from the floor panel 40 and having a hollow bore 54 formed therein to receive a threaded fastener 55 (FIG. 6).

In addition to the above, the main cache body 30 includes a plurality of alignment pins 56, integrally formed with and extending upwardly from the upper surface of the floor panel, for engaging with connecting bosses 90 of the cap member 36.

The card support drawer 32 is configured to receive at least one card therein, which may be a credit card, an I.D. card such as a driver's license, or another card such as a hotel key card. As previously noted, the card cache assembly, including the card support drawer, is specifically designed to receive and store cards which are 3⅜×2⅛ in (85.60×53.98 mm), conforming to the IS O/IEC 7810 ID-1 standard.

Figure 8:
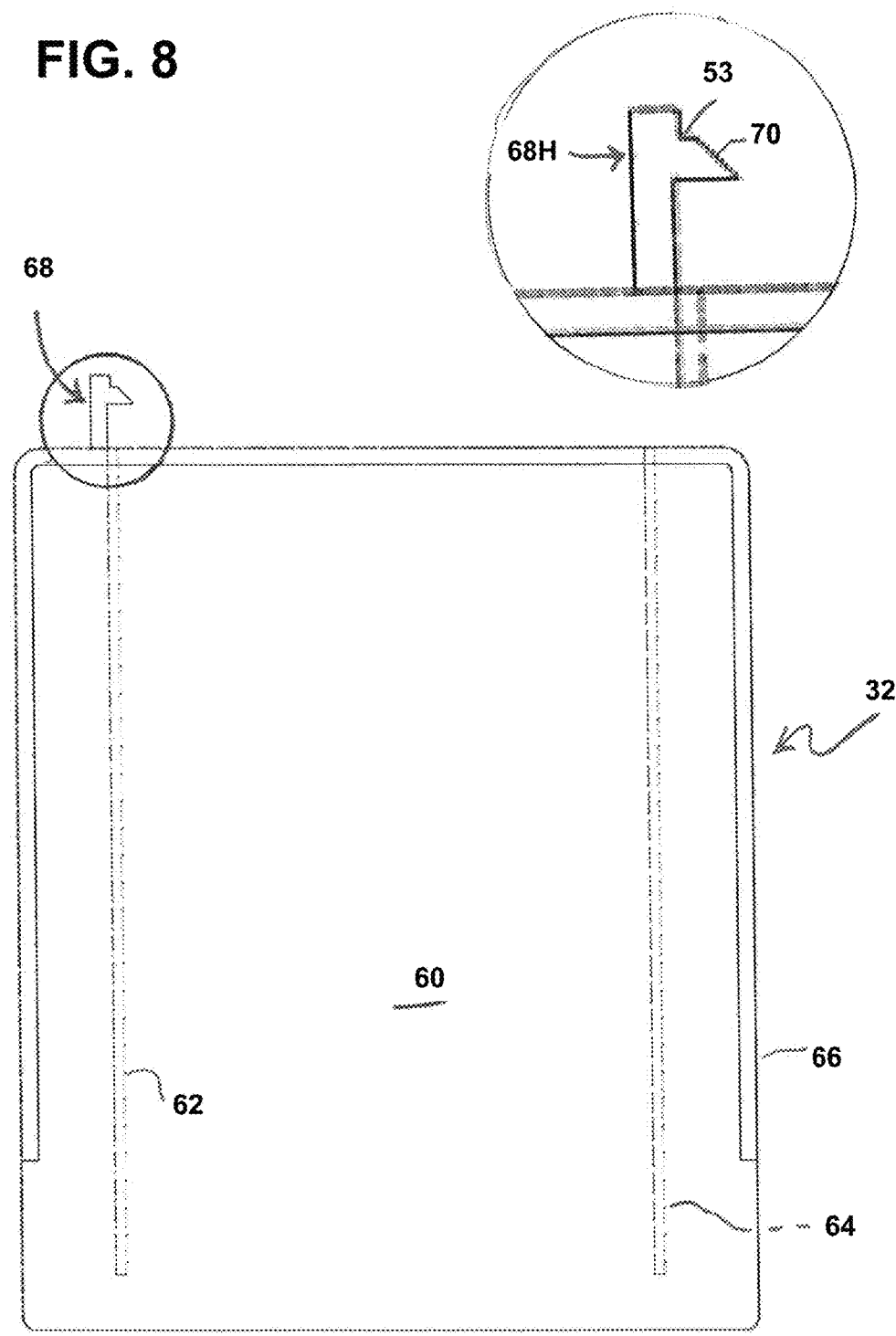
FIG. 8 is a top plan view of a card support drawer which is another component of the card cache assembly of FIG. 6.

The card support drawer 32 may be configured to hold two or three cards in a stacked configuration. Referring also to FIG. 8, it will be seen that the card support drawer includes a substantially rectangular base plate 60 having a pair of parallel projections 62, 64 extending downwardly on a lower surface thereof for slidably engaging in the guide slots 42, 44 of the main card case member 30. The card support drawer 32 also includes a tray wall 66 extending upwardly from portions of the base plate 60 on three sides thereof. If desired, the tray wall 66 may be non-continuous and formed as three separate, spaced-apart wall sections.

In addition, the card support drawer 32 also includes a locking pawl 68 attached to a distal portion of the tray wall 66 on an outer surface thereof. The locking pawl 68 and the latching boss 50 cooperate to define a releasable latch, as will be further described herein. The locking pawl 68 is substantially L-shaped, is formed from a flexibly resilient plastic material, and is configured to releasably engage the latching boss 50 of the cache body 30. The locking pawl 68 is provided with a head portion 68H having a slanted contact face 70, which is configured to slidably engage the angled ramp face 51 of the latching boss 50 during insertion of the card support drawer into the cache assembly, and to permit sliding movement of the head portion past the latching boss 50 when the card support drawer 60 is being manually inserted into the main cache body 30 of the smartphone case 20.

If desired, the head portion 68H of the locking pawl 68 may have a notch 53 (FIG. 8) cut into the slanted contact face 70, to provide a seat for receiving a corner tip portion of the trigger 72 (FIG. 6).

The card cache assembly 22 also includes a spring-loaded release mechanism operable to move the locking pawl 68 out of engagement with the latching boss 50. This release mechanism includes the switch button 38, a switch button spring 71, and a pivotally mounted trigger switch 72 which rotates about a pivot pin 73. The release mechanism further includes a return spring 74 for returning the trigger switch 72 to its resting position.

The card cache assembly 22 further includes an ejection spring 76, for urging the card support drawer 32 outwardly from the main cache body 30, when the trigger switch moves the locking pawl 68 out of engagement with the latching boss 50. It will be understood that such outward movement of the card support drawer 32 enables a user of the smartphone case 20 to access and remove any cards stored therein.

Detailed descriptions of the cap member 36 and the switch button 38 will now be provided, to aid the reader in understanding the operation of the switch button and release mechanism.

As shown in FIG. 6, the cap member 36 fits over a distal end of the main cache body 30 to house the release mechanism. The cap member 36 is also a component of the card cache assembly 22.

Figure 9:
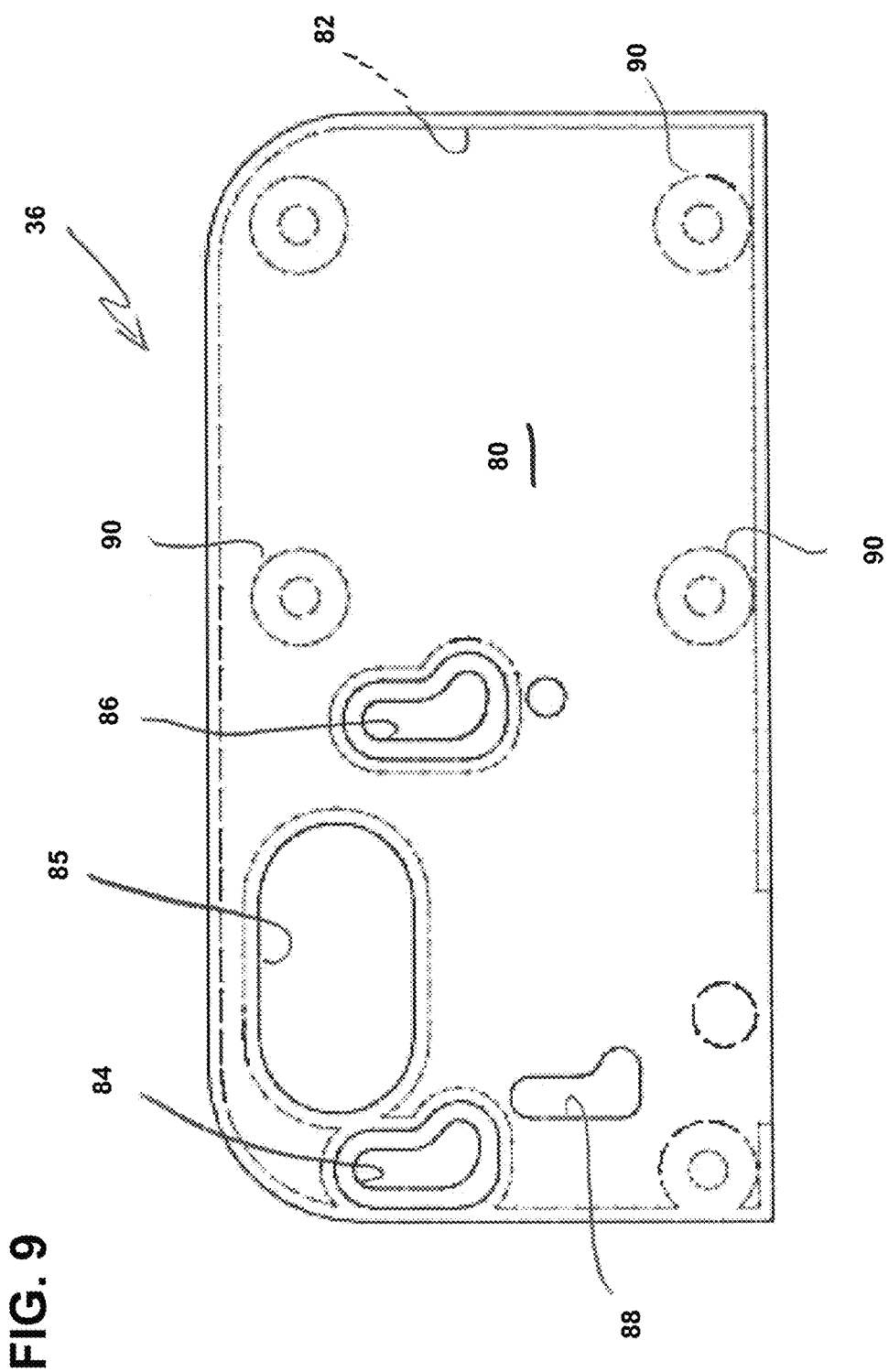
FIG. 9 is a top plan view of a cap member which is another component of the card cache assembly of FIG. 6.

FIG. 9 is a top plan view of the cap member 36, with internal structural parts of the cap member shown in phantom. The cap member 36 includes a primary plate 80 and a side wall 82 integrally formed with the primary plate. Referring now to FIG. 9, it will be seen that the cap member 36 has a pair of spaced-apart, substantially L-shaped switch guide grooves 84, 86 formed therein, as well as a substantially L-shaped release pin guide groove 88. In addition, the cap member 36 has an oval window 85 formed therein, to permit light ingress to pass through the cap member 36 and to reach the phone's camera lens L.

The cap member 36 also has a plurality of connecting bosses 90 formed thereon, extending inwardly from an interior surface of the primary plate 80, for receiving and engaging with the alignment pins 56 of the main cache body 30.

Figure 10:
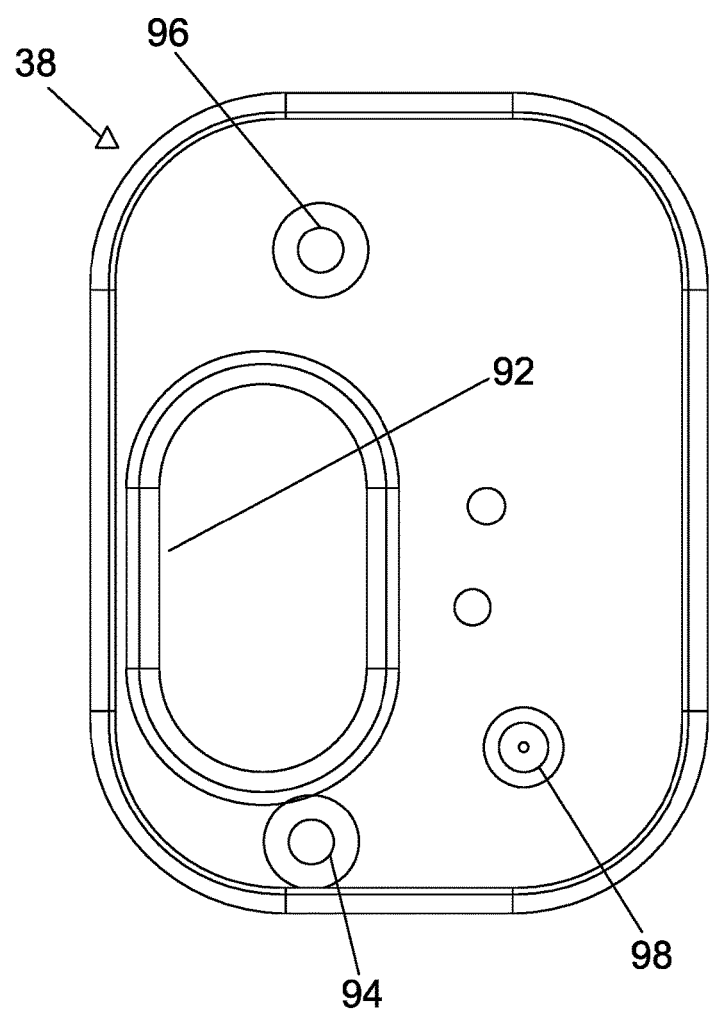
FIG. 10 is a top plan view of an activation switch which is another component of the card cache assembly of FIG. 6.

FIG. 10 is a top plan view of the switch button 38, with internal structural parts of the switch button shown in phantom. The switch button 38 is another component of the card cache assembly 22. The switch button 38 is configured as a frame member surrounding the phone's camera lens L, and has an oval opening 92 formed therein, to permit light ingress to pass through the switch button and to reach the phone's camera lens L, whenever the switch button is in its resting position.

The switch button has three projections extending inwardly thereon, which include two guide posts 94, 96 and a release pin 98. The release pin 98 is provided for contacting the distal end of the trigger switch 72, and for pivotally rocking the trigger switch to move the locking pawl 68 out of engagement with the latching boss 50.

Second Embodiment

A second embodiment of a smartphone case 120 according to the present invention is shown in FIGS. 15-20. The smartphone case 120 according to the second embodiment includes features similar to those described above in connection with the first embodiment, unless such features of the second embodiment are specifically described and/or shown herein as being different from the first embodiment. One aspect of the second embodiment which is different from the first embodiment is the switch and latching mechanism, as further described below.

Figure 15:
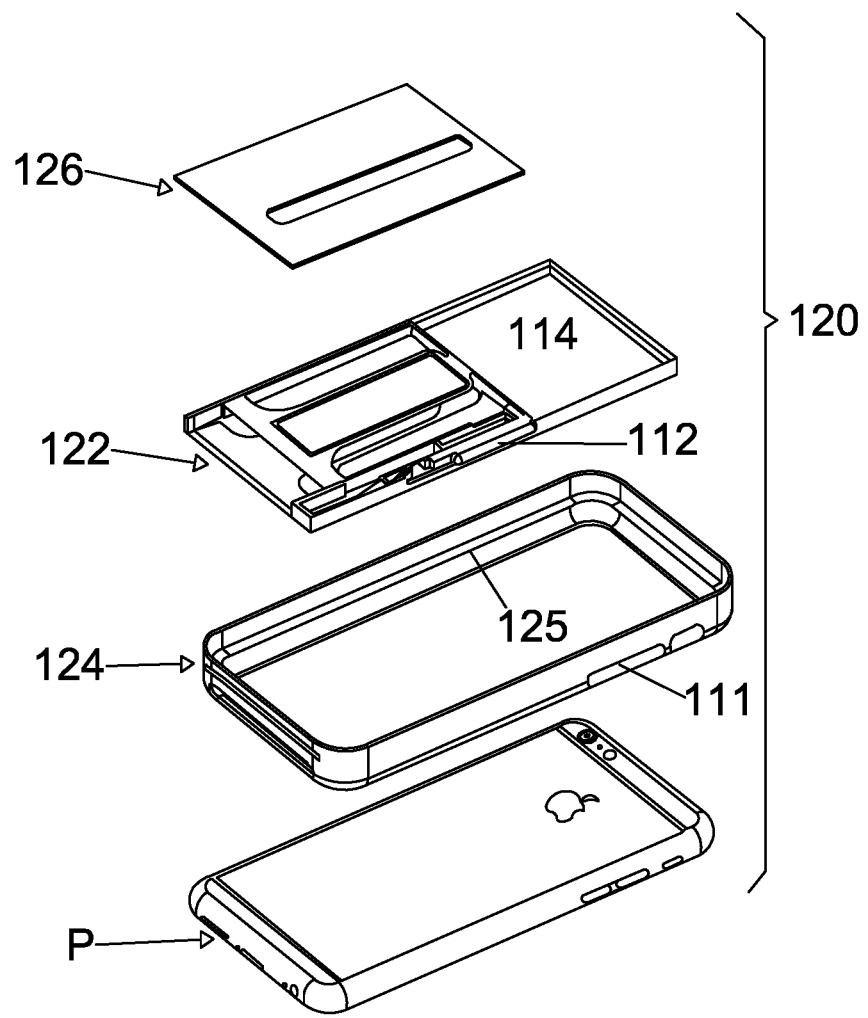
FIG. 15 is an exploded perspective view of the smartphone case and smartphone according to a second embodiment of the invention.

FIG. 15 is an exploded perspective view of the smartphone case 120 according to a second embodiment of the invention, shown along with a smartphone P. Referring now to FIG. 15, it will be seen that the smartphone case 120 according to the second embodiment includes a main sleeve 124 having at least one intermediate alignment structure 125 therein. The main sleeve 124 is configured to protectively receive the smartphone P therein on a first side of the alignment structure 125, which is in the lower half of the sleeve in the orientation shown in FIG. 15, or the upper half as shown in FIG. 1 with the phone P oriented so that a user can easily access a user interface surface 18 thereof.

The main sleeve 124 is open on the end thereof which displays the user interface surface, to enable a user to access that surface as well as the home key HK.

In the second embodiment of the smartphone case 120, the intermediate alignment structure 125 is a rib extending inwardly and substantially continuously around an inner wall of the main sleeve 124 at a central or intermediate height portion of the sleeve. Alternatively, the alignment structure many be discontinuous or a series of spaced apart rib-like protrusions, all substantially coplanar.

The main sleeve 124 has a number of openings formed therein, including the card slot CS and a switch-receiving slot 111, provided to allow part of a switch 112 to protrude outwardly from the smartphone case 20. The main sleeve 124 also has a number of additional openings formed therein for providing access to buttons on the phone P, such as volume buttons and a main power button 500 (FIG. 1).

The smartphone case 120 also includes the card cache assembly 122, which is configured to fit into the main sleeve 124 on a second side of the alignment structure 125, which is the top half of the sleeve in the orientation shown in FIG. 5, with the phone's touchscreen facing downwardly, and with the card cache assembly stacked abuttingly in contact with the rear surface of the phone P.

The smartphone case 120 according to the second embodiment also includes a card cache cover 126, which fits over the card cache assembly 122 in the phone storage sleeve on the second side of the alignment structure 125, opposite the smartphone P.

Main Cache Body

Figure 16:
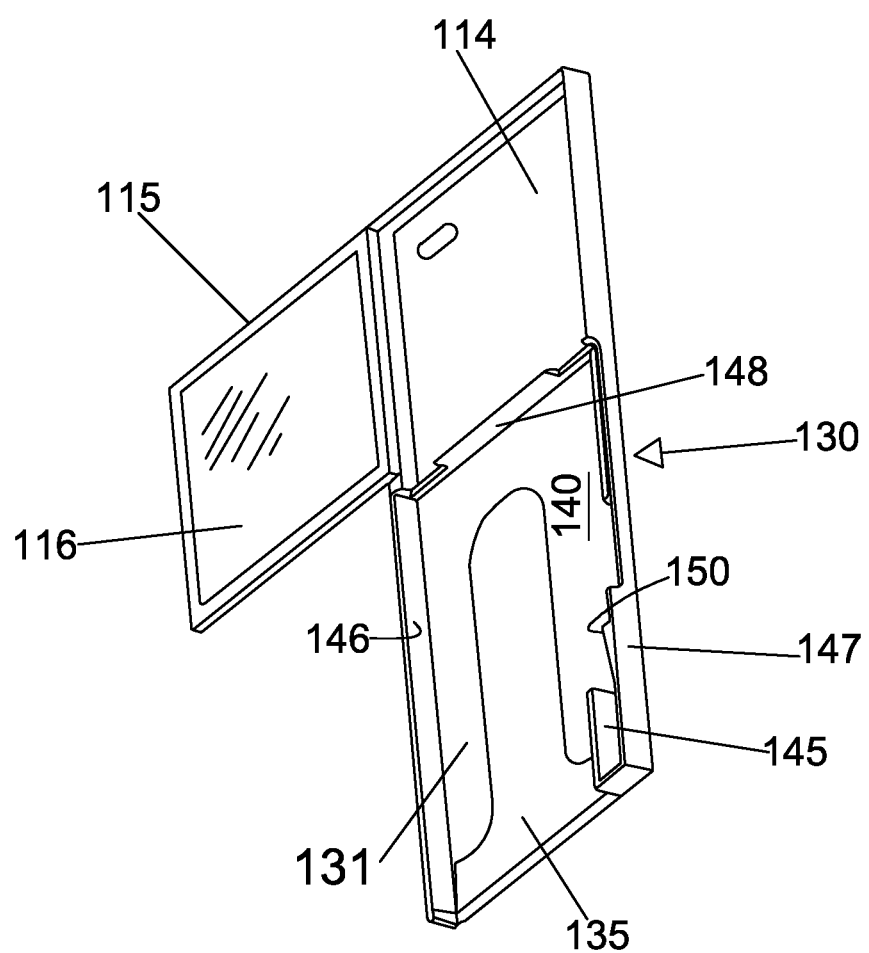
FIG. 16 is a detailed view of a main cache body which is a component part of the smartphone case according to the second embodiment of the invention.
Figure 17:
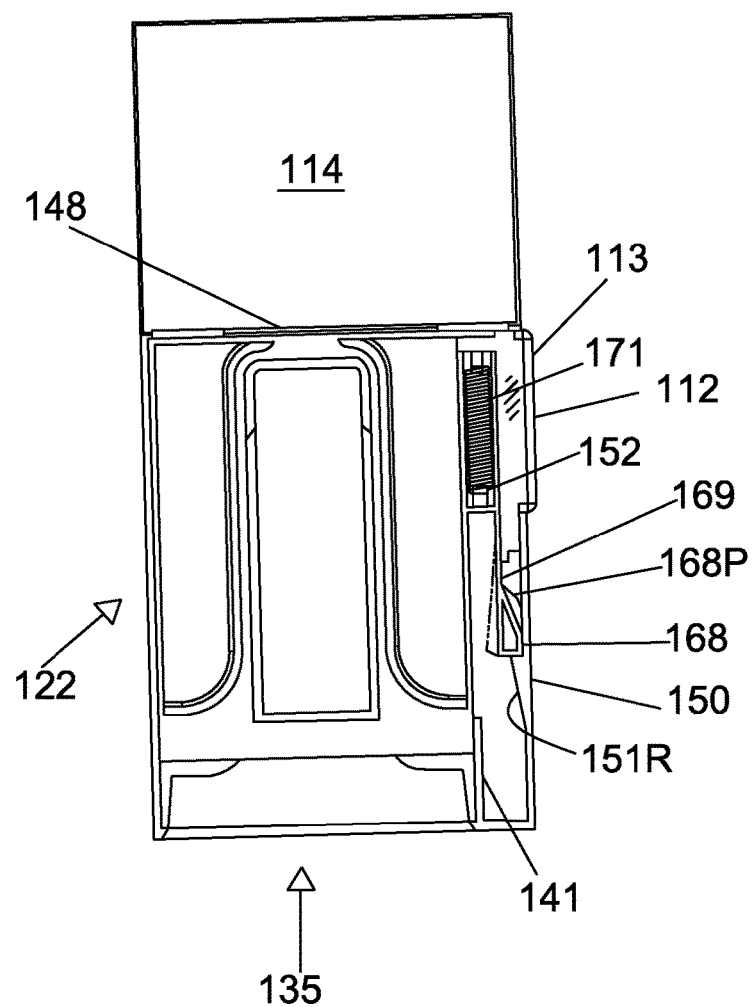
FIG. 17 is a top plan view of a card cache assembly which is a subassembly of the smartphone case according to the second embodiment of the invention.

Referring also to FIGS. 16-17, the main cache body 130 has a hollow space 131 formed therein for storing the card support drawer 132, and has a primary opening 135, formed at one end thereof and communicating with the hollow space. The main cache body 130 includes a substantially rectangular floor panel 140 and an alignment wall 141 formed integrally with the floor panel 140, to guide slidable movement of the card support drawer 132 in the main cache body.

The main cache body 130 may have a hollow opening formed through the floor panel 140 to provide access for the phone's camera lens L (FIG. 11) to view outwardly. Alternatively, the main cache body 130 may be formed in a size and shape so as not to obstruct the phone's camera lens L. The main cache body 130 also includes opposed first and second side walls 146, 147 surrounding portions of the floor panel 140. No wall portion is provided at the end portion of the main cache body which defines the primary opening 135, and which slidably receives the card support drawer 132.

The main cache body 130 further includes a vertically oriented drawer guide member 145 extending upwardly from the floor panel 140 near the second side wall 147. The drawer guide member 145 is provided to cooperate with the first side wall guide 146 to guide slidable movement of the card support drawer 132 in the main cache body.

The main cache body 130 further includes at least one internal stop member 148 which extends vertically upwardly from the floor panel 140, and also extends across the main cache body in a direction substantially perpendicular to the side walls 146, 147. The stop member 148 is provided to limit inward travel of the card support drawer 132.

Figure 18:
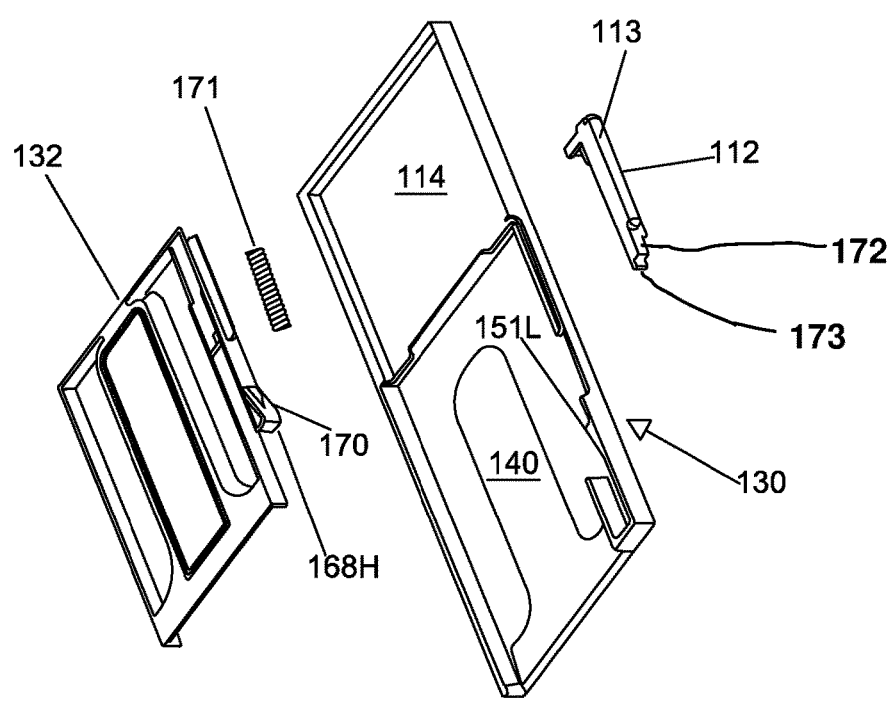
FIG. 18 is an exploded perspective view of the card cache assembly of FIG. 17.

The main cache body 130 also includes an integrally formed latching boss 150 attached to the second side wall 147 and extending upwardly from the floor panel 140. The latching boss 150 is provided with an angled ramp face 151R to permit slidable movement of a locking pawl 168 therepast, and is further provided with a flattened contact face or ledge 151L, for engaging the locking pawl 168 in a closed position of the card support drawer 132, as shown in FIGS. 17 and 18.

Optionally, the main cache body 130 may include an auxiliary storage tray 114 (FIG. 16) provided in back of the stop member 148, and a corresponding auxiliary cover 115 may also be provided to cover and close the storage tray. Where provided, the auxiliary storage tray 114 may be used to store flat items such as one or more metal keys, folded paper money or other small personal items.

The auxiliary cover 115, where used, may be pivotally attached to the main cache body 130. Alternatively, the auxiliary cover 115 may be slidaby attached to the main cache body 130 using integral rails (not shown), or may be removably attached using clips in a manner similar to a battery case cover on a TV remote control unit. If desired, an inner surface of the auxiliary cover 115 may have a small mirror 116 mounted thereon.

Card Support Drawer

The card support drawer 132 is configured to receive at least one card therein, which may be a credit card, an I.D. card such as a driver's license, or another card such as a hotel key card. As previously noted, the card cache assembly, including the card support drawer, is preferably designed to receive and store cards which are 3⅜×2⅛ in (85.60×53.98 mm), conforming to the IS O/IEC 7810 ID-1 standard.

Figure 19:
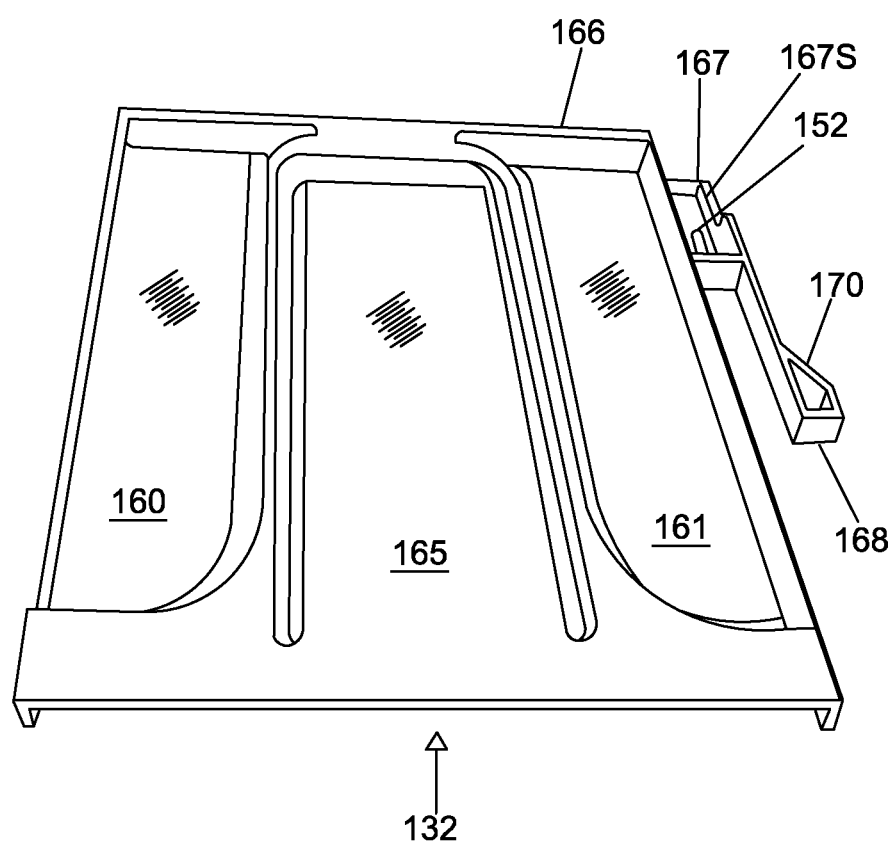
FIG. 19 is a detailed view of a card support drawer which is another component part of the smartphone case according to the second embodiment of the invention.

The card support drawer 132 may be configured to hold two or three cards in a stacked configuration. Referring also to FIG. 19, it will be seen that the card support drawer 132 includes a pair of spaced-apart base panel portions 160, 161. The card support drawer 132 also includes a tray wall 166 extending upwardly from portions of the base panel portions 160, 161 on three sides of the card support drawer. If desired, the tray wall 166 may be non-continuous and formed as three separate, spaced-apart wall sections.

Optionally, the card support drawer 132 may include an integrally formed card cover plate 165, which is disposed at a level above the base panel portions 160, 161. In the depicted embodiment, the card cover plate 165 is attached at multiple points to upper end portions of the tray wall 166. Sufficient space is provided between the base panel portions 160, 161 and the card cover plate 165 to accommodate two or three cards as previously described, in a stacked configuration.

The card support drawer 132 further includes a spring housing box 167 attached to a distal right-side portion of the tray wall 166. A cylindrically-shaped integral first spring support boss 152 (FIGS. 17, 19), is disposed in the spring housing box and extends in a direction away from the primary opening 135, for receiving one end of a coil spring 171 thereon. The spring housing box 167 may include a reduced-height step portion 167S to accommodate a bridge portion of the switch 112.

In addition, the card support drawer 132 also includes a locking pawl 168, attached to the spring box 167 at the distal portion of the tray wall 166 on an outer surface thereof. The locking pawl 168 and the latching boss 150 cooperate to define a releasable latch, as will be further described herein. The locking pawl 168 is substantially wedge-shaped, is formed from a flexibly resilient plastic material, and is configured to releasably engage the latching boss 150 of the main cache body 130. The locking pawl 168 is provided with a head portion 168H (FIG. 18) having a slanted contact face 170, which is configured to slidably engage the angled ramp face 151 of the latching boss 150 during insertion of the card support drawer into the cache assembly. The angled ramp face 151 also permits sliding movement of the head portion 168H past the latching boss 150 when the card support drawer 132 is being manually inserted into the main cache body 130 of the smartphone case 120.

The locking pawl 168 also includes a flexible neck portion 169 interconnecting the head portion 168H to the spring housing box 167, as shown. If desired, the head portion 168H of the locking pawl 168 may have a projection 168P (FIGS. 18-20) formed thereon and extending outwardly from a portion of the slanted contact face 170, to provide for rapid movement of the locking pawl off of the ledge 151L (FIG. 18) when activated by the switch 112, as shown in FIG. 17, for example.

The card cache assembly 122 also includes a spring-loaded release mechanism, which is operable to move the locking pawl 168 out of engagement with the latching boss 150. This release mechanism includes the switch 112, and the spring 171.

Switch

A detailed description of the switch 112 will now be provided, to aid the reader in understanding the operation thereof. The switch 112 includes a gripping portion 113, a second cylindrical spring support boss 153, and a working end 172 provided with a trigger tip 173. The second cylindrical spring support boss 153 is provided for supporting an end of the coil spring 171 opposite to the first spring support boss 152.

The spring 171 is provided for urging the card support drawer 132 outwardly from the main cache body 130, when the trigger tip 173 moves the head 168H of the locking pawl 168 out of engagement with the latching boss 150. It will be understood that such outward movement of the card support drawer 132 enables a user of the smartphone case 120 to access and to selectively remove any or all cards stored therein.

Figure 20:
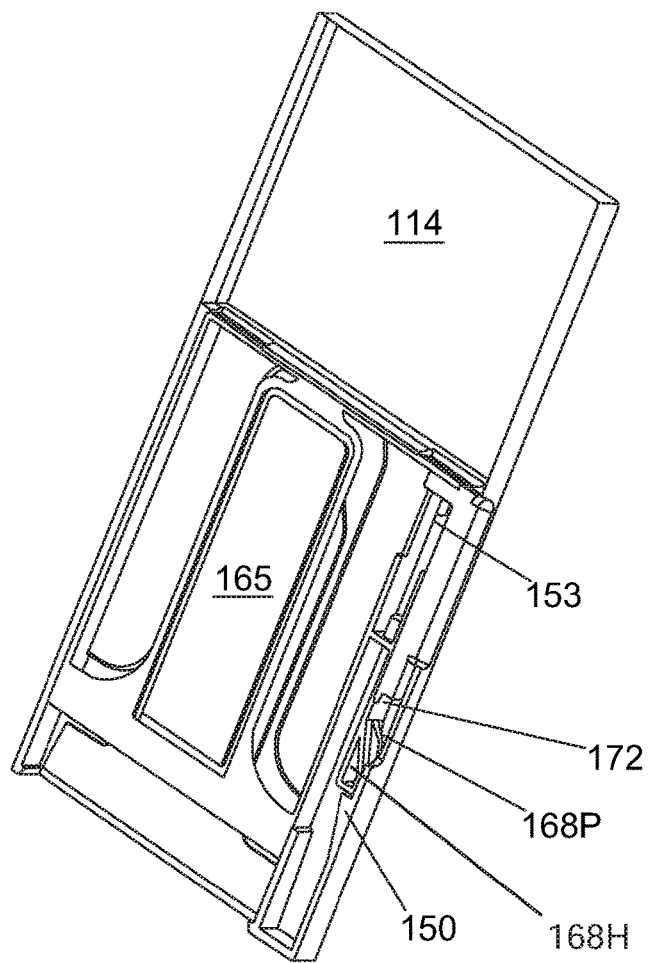
FIG. 20 is an perspective view of the card cache assembly of FIG. 17.

The switch 112 has a groove (not shown) formed in the underside thereof, and as shown in FIG. 20, the switch 112 fits over abutting side wall portions of the card support drawer 132 and the main cache body 130, with the triggering tip portion 172 disposed proximate the head 168 H of the locking pawl 168. When a user pushes on the gripping portion 113 of the switch 112 to slidably move the switch in the direction of the main opening 135, the triggering tip portion 172 of the switch moves the locking pawl to the position shown in phantom in FIG. 17. This releases the card support drawer 132 from engagement with the main cache body 130, and the force of the spring 171 then pushes the card support drawer toward the main opening. This allows enough of the tip portion of a card or cards stored in the card support drawer to extend outwardly from main opening 135, allowing a user to grab the card or cards between the user's thumb and forefinger, facilitating removal of the card(s) from the card support drawer 132, as needed.

In order to reinstall the card support drawer 132 inside of the main cache body 130, a user only has to press the drawer inwardly until the locking pawl seats itself on the ledge 151L.

The smartphone case according to the invention may be configured and dimensioned to fit any model currently on the market, and may also be adapted to sizes to fit future smartphones.

Method of Use

Figure 21:
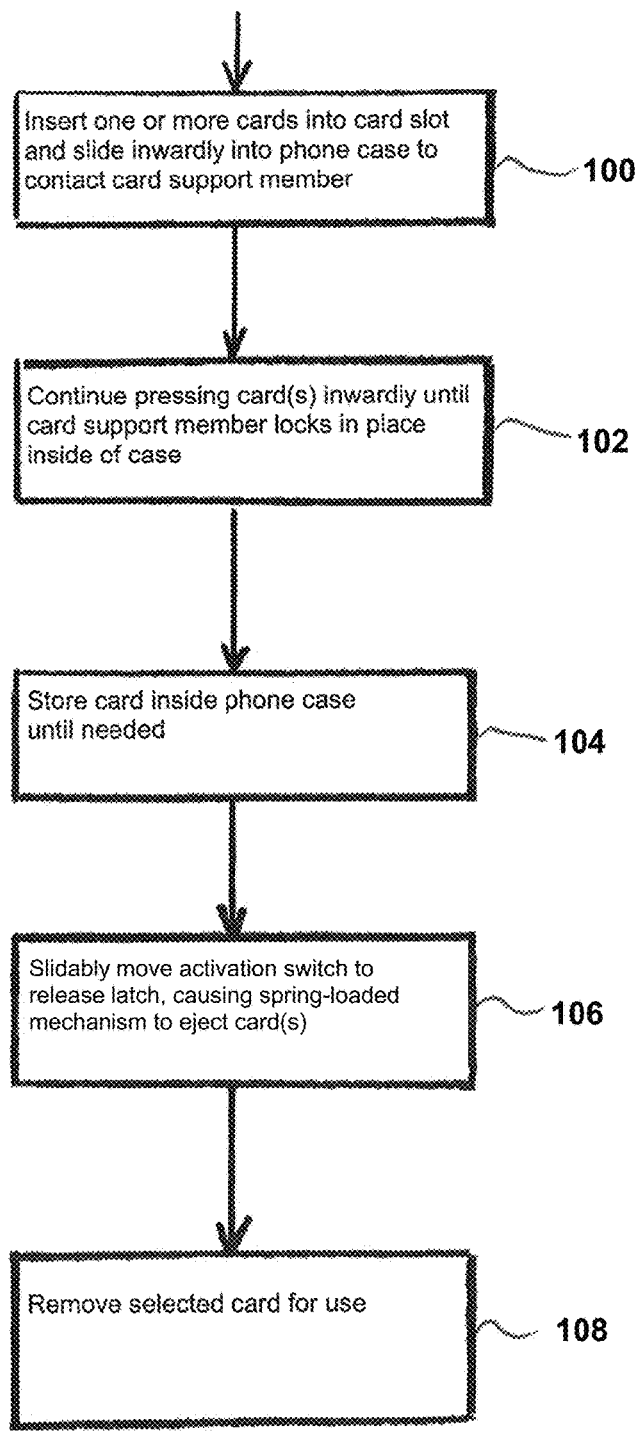
FIG. 21 is a simplified schematic diagram showing steps in the method according to the invention.

Referring now to FIG. 21, a first step in the method of using the smartphone case 20 or 120 hereof is illustrated. For purposes of convenience, the method will be described a single card 400, although it will be understood that one, two or more cards may be used. The card 400 is slid into the card slot CS (FIG. 4) until it contacts the innermost edge of the card support drawer 32 or 132. The above-described insertion step is illustrated in FIG. 11, and is also shown at 100 in the simplified schematic flow chart of FIG. 21.

The card 400 is then pushed in further to move the card support drawer inwardly in the main cache body against the force of the ejection spring 76 or 171, until the locking pawl 68 or 168 slides inwardly past the latching boss 50 or 150.

Figure 12A:
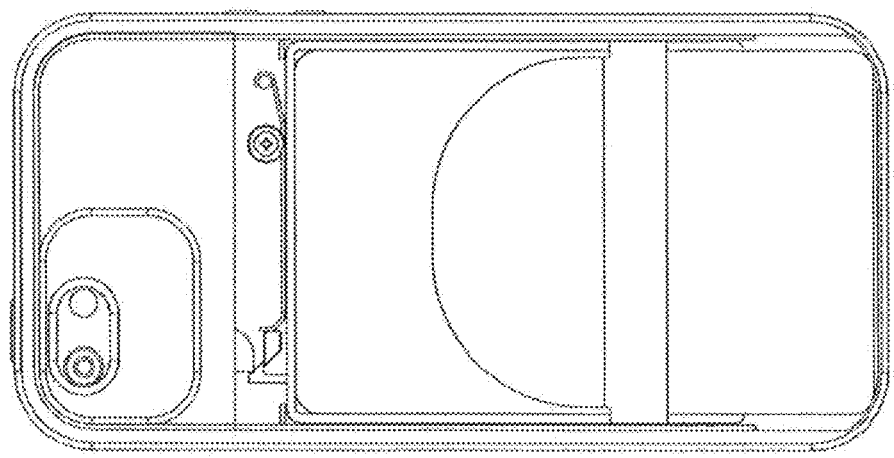
FIG. 12A is a top plan view of the card cache assembly similar to FIG. 11, but with the assembly shown at the conclusion of a second step in the method hereof, with a card support drawer locked inside of the case.
Figure 12B:
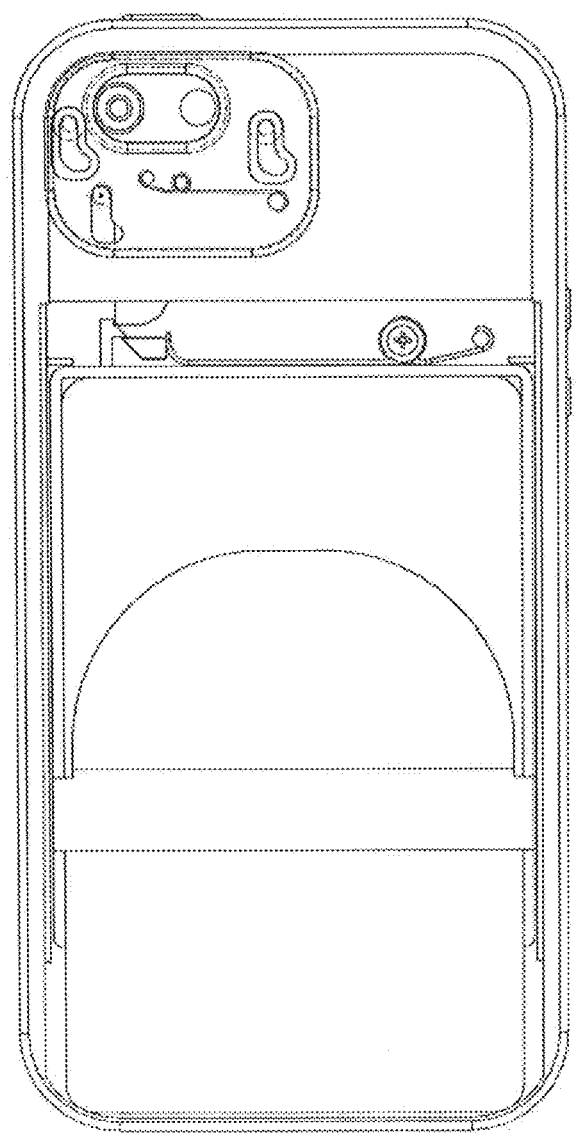
FIG. 12B is a top plan view of the card cache assembly which is similar to FIG. 12A, but with selected internal parts of a spring-loaded ejection mechanism shown in phantom.
Figure 12C:
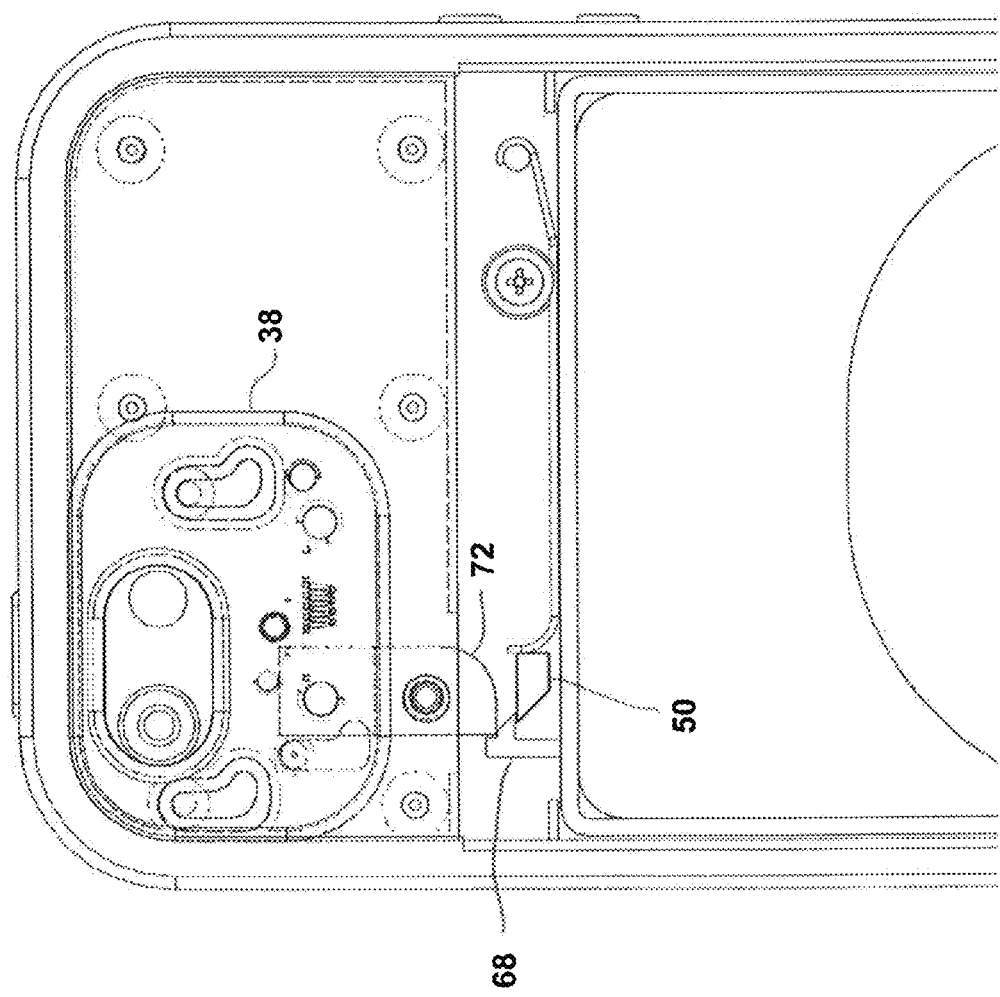
FIG. 12C is a detail plan view of a distal end of the card cache assembly similar to FIG. 12B, showing an alternate embodiment of the spring-loaded ejection mechanism.

In the method of using the first embodiment hereof, the slanted contact face 70 of the locking pawl then contacts a corner tip portion of the trigger 72, and pushes the distal end of the trigger towards the latching boss 50, which is to the right as seen in FIGS. 12A-12C. This pivotally rotates the trigger 72 around the pivot pin 73. The corner tip portion of the trigger 72 may then become seated in the notch 53 formed in the head portion 68H of the locking pawl 68.

Because of the flexibly resilient material of the locking pawl 68, 168, once the head portion 68H, 168H passes by the latching boss 50, 150, the locking pawl moves to the right as shown in the drawings, the latch is automatically closed, and the card support drawer 32 or 132 is temporarily locked in position with the card 400 stored inside of the smartphone case 20 or 120. This locking step is shown at 102 in FIG. 21, and the locked position of the latch and card support drawer is also shown in FIGS. 12A-12C and 17.

The next step in the method according to the present invention is to store the card 400 inside of the smartphone case 20 until it is needed for use. This storing step is shown at 104 in FIG. 21, and may last any time between a few minutes and a few days or weeks, or for as long as desired by a user. This storing step is shown at 104 in FIG. 21.

Figure 13A:
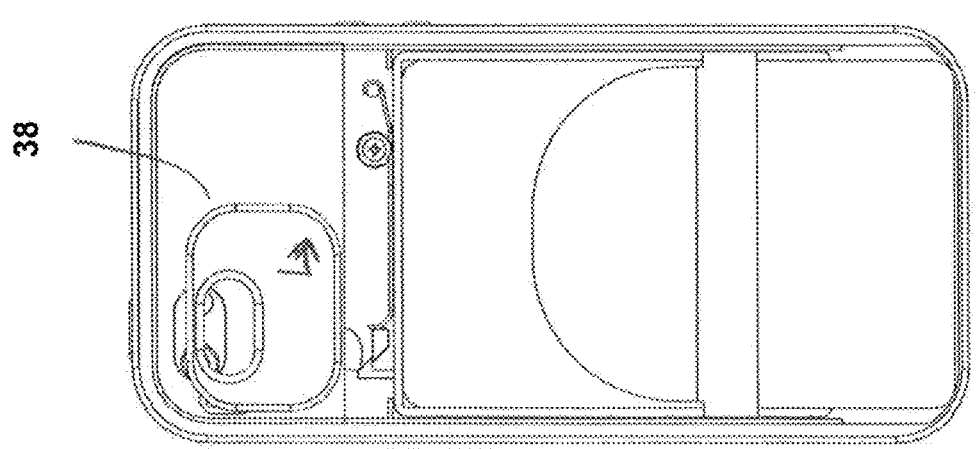
FIG. 13 A is a top plan view of the card cache assembly similar to FIG. 12A, but with the assembly shown during of another step in the method hereof, with an activation switch shown moved to a card release position.
FIG. 13B is a top plan view of the card cache assembly which is similar to FIG. 13A, but with selected internal parts of a spring-loaded ejection mechanism shown in phantom.
Figure 13B:
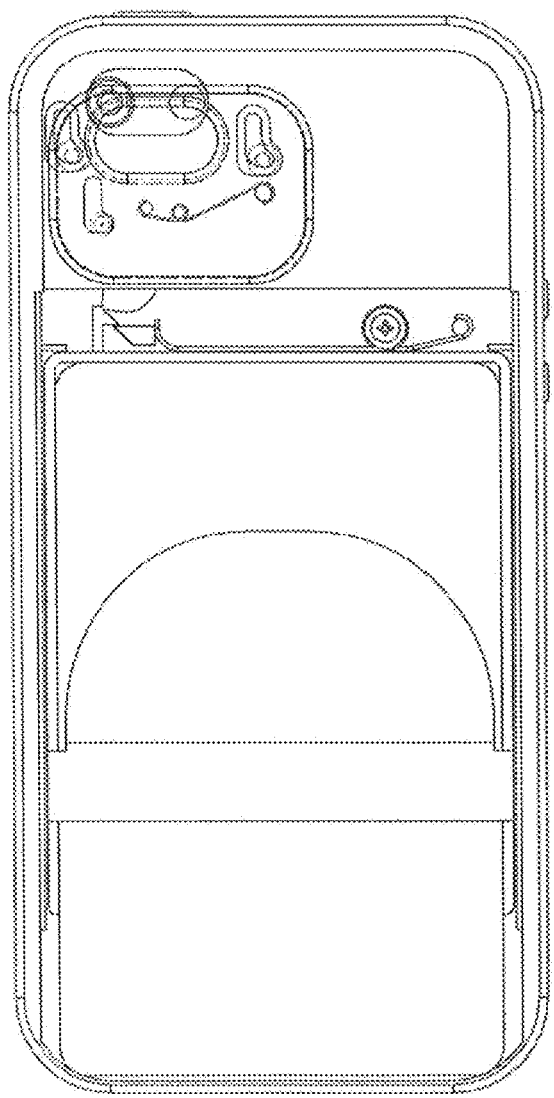
Figure 14:
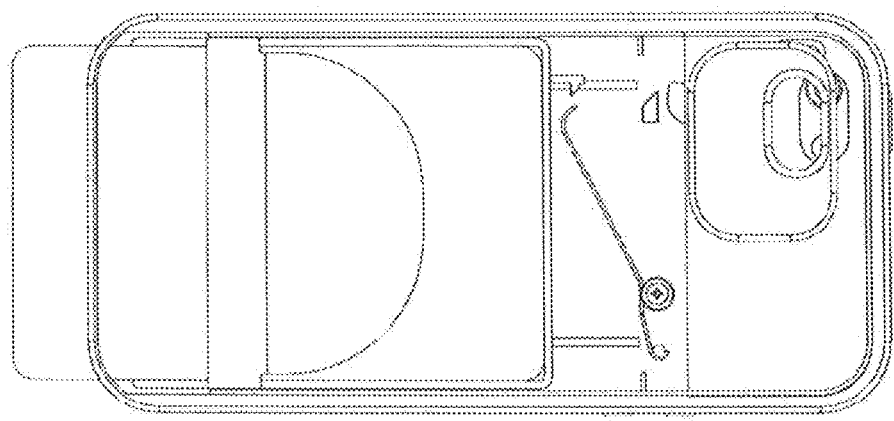
FIG. 14 is a top plan view of the card cache assembly similar to FIG. 11, showing the card after it has been ejected from the case.

When the user is ready to release the card 400 from the smartphone case 20, the next step in the method according to the present invention is to manually move the switch 38 in an L-shaped release configuration, first toward the proximal end of the phone, and then toward the right. The path of this movement is defined by the substantially L-shaped switch guide grooves 84, 86 formed in the cap member 36. At the same time, this moves the release pin 98 to contact the distal end of the trigger switch 72, and to pivotally rock the trigger switch to move the locking pawl 68 out of engagement with the latching boss 50. This switch activation step is shown at 106 in FIG. 21, and is also shown in FIGS. 13A and 13B. The released position of the card support drawer is shown in FIG. 14, with the switch also shown at the conclusion of activation.

The final step in the method hereof is to remove the card 400 from the smartphone case. This step is shown at 108 in FIG. 21. If more than one card is stored in the card support drawer, whichever card is needed at the time may be selected, and the card support drawer may then be reinserted into the case.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A smartphone case for protectively receiving a smartphone, said smartphone case comprising:
    a phone storage sleeve having at least one intermediate alignment structure therein, said phone storage sleeve configured to protectively receive a smartphone body therein on a first side of the alignment structure;
    a card cache assembly configured to fit into the phone storage sleeve on a second side of the alignment structure, the card cache assembly comprising:
    a main cache body having a hollow space formed therein and having a primary opening formed at one end thereof and communicating with said hollow space,
    a card support drawer slidably mounted in the main cache body, and
    a latch for retaining the card support drawer inside of the main cache body, the latch comprising a latching boss integrally formed with the main cache body, and a locking pawl attached to a side portion of the card support drawer, the locking pawl being releasably engageable with the latching boss;
    the smartphone case further comprising a spring-loaded ejection mechanism, and a switch which is operable to disengage the latch and release an outer end portion of the card support drawer from the main cache body using the spring-loaded ejection mechanism.

2. The smartphone case of claim 1, further comprising a secondary cover plate which fits over an auxiliary storage chamber formed inside of the phone storage sleeve on the second side of the alignment structure.

3. The smartphone case of claim 1, wherein the locking pawl is formed from a flexibly resilient plastic material.

4. The smartphone case of claim 3, wherein the latching boss comprises an angled ramp face, and the locking pawl comprises a generally wedge-shaped head portion having a contact face which is configured to slidably engage the angled ramp face of the latching boss, and to permit sliding movement of the head portion past the latching boss when the card support drawer is inserted into the main cache body.

5. The smartphone case of claim 1, further comprising a cap member which fits over the main cache body at one end thereof.

6. The smartphone case of claim 1, further comprising a rocking trigger which is pivotally mounted in the main cache body, and which is operable to move the locking pawl out of engagement with the latching boss.

7. The smartphone case of claim 1, further comprising a spacer plate which is operatively attached to the card support drawer.

8. A method of caching one or more cards in the smartphone case of claim 1, said method comprising steps of:
    a) inserting said cards into a card slot formed in the smartphone case, and sliding the cards inwardly into the smartphone case to contact the card support drawer;
    b) pressing the cards inwardly until the card support drawer locks in place inside of the smartphone case;
    c) storing the cards inside of the smartphone case;
    d) slidably moving the switch to release the latch, causing the spring-loaded ejection mechanism to eject the card support drawer from the smartphone case to an extent sufficient to permit grasping of the cards by a user; and
    e) removing a selected one or more of the cards from the smartphone case.

9. A smartphone case for protectively receiving a smartphone, said smartphone case comprising:
    a phone storage sleeve having at least one intermediate alignment structure therein, said phone storage sleeve configured to protectively receive a smartphone body therein on a first side of the alignment structure;
    a card cache assembly configured to fit into the phone storage sleeve on a second side of the alignment structure, the card cache assembly comprising:
    a main cache body having a hollow space formed therein and having a primary opening formed at one end thereof and communicating with said hollow space,
    a card support drawer slidably mounted in the main cache body, and
    a latch for retaining the card support drawer inside of the main cache body,
    the smartphone case further comprising a spring-loaded ejection mechanism, and a switch which is operable to disengage the latch and release an outer end portion of the card support drawer from the main cache body using the spring-loaded ejection mechanism,
    wherein:
    the main cache body comprises a retaining ledge and a spring-receiving space for holding a spring;
    the card support drawer comprises a flexibly resilient locking pawl including a wedge-shaped head portion having a flattened tip end configured to abuttingly contact the retaining ledge of the main cache body; and
    the spring-loaded ejection mechanism comprises a switch button slidably attached to the main cache body, said switch button comprising a grippable part operable to cause a portion of the switch to push on the wedge-shaped head portion of the locking pawl to move the locking pawl out of engagement with the retaining ledge.

10. The smartphone case of claim 9, wherein the switch includes a projecting finger for engaging the wedge-shaped head portion of the locking pawl and for sliding the locking pawl out of engagement with a latching boss when the switch is slidably moved in a direction to compress a spring.

11. A smartphone case comprising:
    a phone storage sleeve having at least one intermediate alignment structure therein, said phone storage sleeve configured to protectively receive a smartphone body therein on a first side of the alignment structure;
    a card cache configured to fit into the phone storage sleeve on a second side of the alignment structure; and a cover plate which fits over the card cache at one surface of the phone storage sleeve;

wherein the card cache comprises:

a main card case member having a hollow space formed therein and having a primary opening formed at one end thereof and communicating with said hollow space, said main card case member comprising:
- a substantially rectangular floor panel having a pair of parallel guide slots formed therein;
- a side wall surrounding portions of the floor panel on three sides thereof;
- at least one stop member extending inwardly from a portion of the side wall;
- a latching boss integrally formed with and extending upwardly from the floor panel;
- a first spring support boss extending upwardly from the floor panel and having a hollow bore formed therein to receive a threaded fastener;

a card support drawer configured to receive at least one card therein, the card support drawer comprising:
- a substantially rectangular base plate having a pair of parallel projections extending downwardly on a lower surface thereof for slidably engaging in the guide slots of the main card case member;
- a tray wall extending upwardly from portions of the base plate on three sides thereof; and
- a locking pawl attached to a distal portion of the tray wall on an outer surface thereof, the locking pawl configured to releasably engage the latching boss of the main card case member;

a spring-loaded ejection mechanism operable to move the locking pawl out of engagement with the latching boss; and an ejection spring for urging the card support drawer outwardly from the main card case member.

12. The smartphone case of claim 11, further comprising a switch button configured as a frame member configured for surrounding a camera lens of the smartphone body, said switch button having an opening formed therein to permit light ingress therethrough when the switch button is in a resting position, the switch button having two guide posts and a release pin extending inwardly thereon.

13. The smartphone case of claim 12, wherein a predetermined sequence of movement of the switch button in two different directions is required in order to activate the ejection mechanism.

14. The smartphone case of claim 11, wherein the latch comprises a latching boss integrally formed with the main cache body, and a locking pawl attached to a distal portion of the card support drawer, the locking pawl being releasably engageable with the latching boss.

15. The smartphone case of claim 14, wherein the locking pawl is substantially L-shaped and is formed from a flexibly resilient plastic material.

16. The smartphone case of claim 15, wherein the latching boss comprises an angled ramp face, and the locking pawl comprises a head portion having a slanted contact face which is configured to slidably engage the angled ramp face of the latching boss, and to permit sliding movement of the head portion past the latching boss when the card support drawer is inserted into the main cache body.

17. The smartphone case of claim 16, wherein the head portion of the locking pawl has a notch formed in the angled ramp face to provide a seat for receiving a corner portion of a trigger therein.

18. The smartphone case of claim 11, further comprising a cap member which fits over the main card case member at one end thereof.

19. The smartphone case of claim 11, further comprising a spacer plate which is operatively attached to the card support drawer.

* * * * *